United States Patent
He et al.

(10) Patent No.: US 12,317,217 B2
(45) Date of Patent: May 27, 2025

(54) METHOD AND APPARATUS FOR ESTABLISHING POSITIONING NETWORK

(71) Applicant: POSITEC POWER TOOLS (SUZHOU) CO., LTD., Suzhou (CN)

(72) Inventors: Mingming He, Suzhou (CN); Shuanglong Wu, Suzhou (CN); Xinyi Zhang, Suzhou (CN)

(73) Assignee: Positec Power Tools (Suzhou) Co., LTD., Jiangsu (CN)

( * ) Notice: Subject to any disclaimer, the term of this patent is extended or adjusted under 35 U.S.C. 154(b) by 496 days.

(21) Appl. No.: 17/775,259

(22) PCT Filed: Nov. 6, 2020

(86) PCT No.: PCT/CN2020/127179
§ 371 (c)(1),
(2) Date: May 6, 2022

(87) PCT Pub. No.: WO2021/088997
PCT Pub. Date: May 14, 2021

(65) Prior Publication Data
US 2022/0408399 A1 Dec. 22, 2022

(30) Foreign Application Priority Data
Nov. 6, 2019 (CN) .......................... 201911078150.3

(51) Int. Cl.
*H04W 64/00* (2009.01)
*G01S 5/00* (2006.01)
*H04W 16/18* (2009.01)

(52) U.S. Cl.
CPC .......... *H04W 64/00* (2013.01); *G01S 5/0081* (2013.01); *H04W 16/18* (2013.01)

(58) Field of Classification Search
CPC ..... H04W 64/00; H04W 16/18; G01S 5/0081; G01S 19/04; G01S 19/073; G01S 19/43
See application file for complete search history.

(56) References Cited

U.S. PATENT DOCUMENTS

2014/0277627 A1 * 9/2014 Bastawros ............ H04N 23/69
700/91
2019/0166542 A1 5/2019 Huang

FOREIGN PATENT DOCUMENTS

| CN | 106851606 A | 6/2017 |
| CN | 107703525 A | 2/2018 |

(Continued)

*Primary Examiner* — Daryl C Pope
(74) *Attorney, Agent, or Firm* — Lee & Hayes, P.C.

(57) ABSTRACT

The present disclosure relates to a method and an apparatus for establishing a positioning network. The positioning network includes a data processing center and at least one reference station, and one node in the positioning network represents one reference station. The method includes: determining, if a first historical positioning network capable of forming a new positioning network with a newly added node exists in a network list of the data processing center, whether the newly added node forms the new positioning network with the first historical positioning network; and determining, if the network list does not exist in the data processing center, whether the newly added node is capable of forming a new positioning network with nodes in a first node information list. Before network real-time kinematic (RTK) is formed, a user can use a single-baseline RTK positioning service. The network RTK is formed once a networking condition is met. A positioning network is gradually established, requirements of users may be satisfied with less investment when there are fewer users in the early stage, and the network is gradually formed with the increase of users, so that more users can be covered by using fewer base stations.

17 Claims, 7 Drawing Sheets

(56) References Cited

FOREIGN PATENT DOCUMENTS

CN       109870714 A    6/2019
WO    2006/130334 A1  12/2006

\* cited by examiner

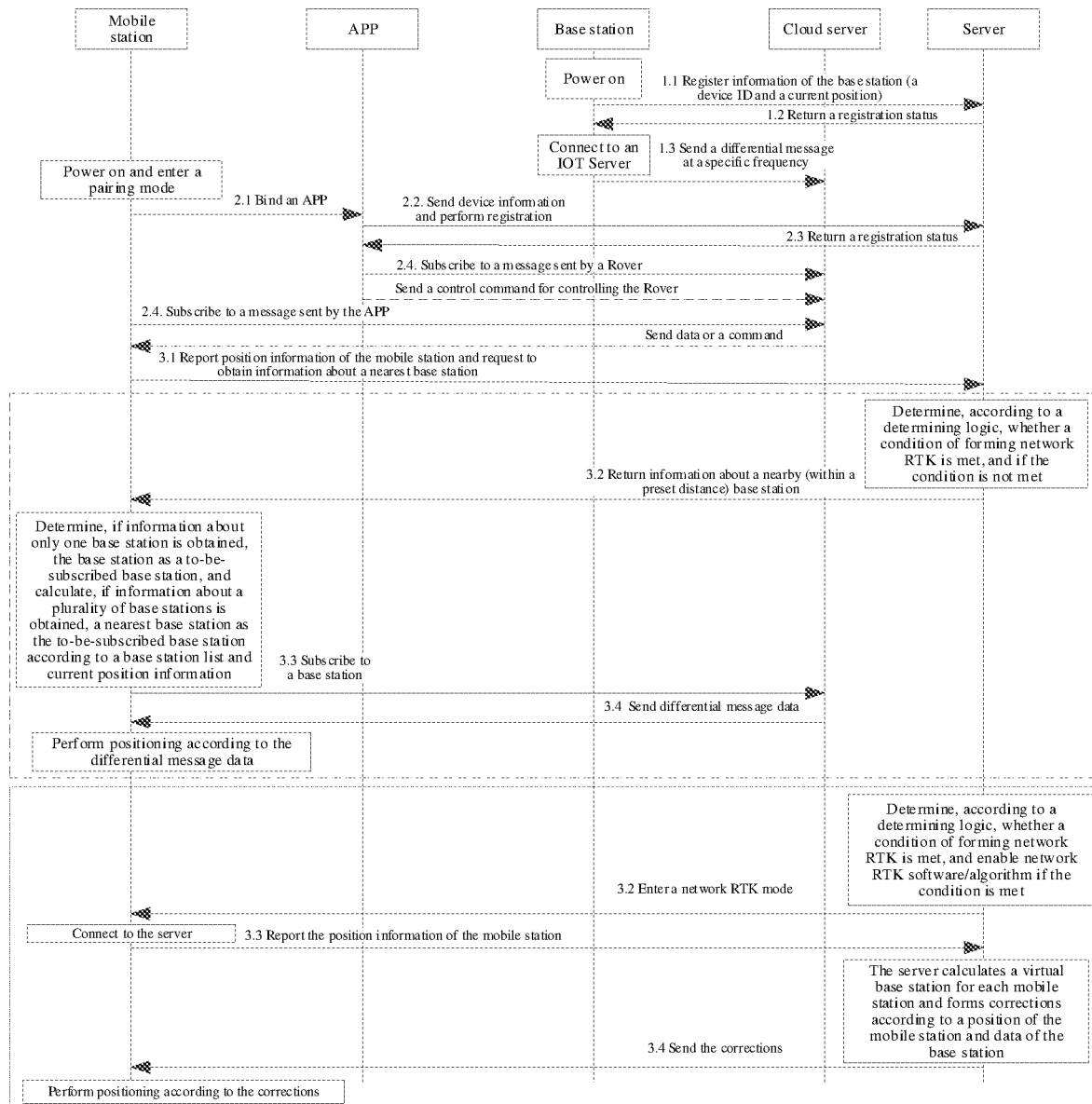
FIG. 2
  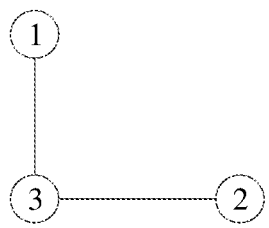 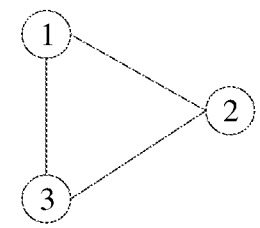
FIG. 3a   FIG. 3b   FIG. 3c

METHOD AND APPARATUS FOR ESTABLISHING POSITIONING NETWORK

CROSS-REFERENCE TO RELATED APPLICATION

This application is a National Stage Application of International Application No. PCT/CN2020/127179, filed on Nov. 6, 2020, which claims benefit of and priority to Chinese Patent Application No. 201911078150.3, filed on Nov. 6, 2019, all of which are hereby incorporated by reference in their entirety for all purposes as if fully set forth herein.

TECHNICAL FIELD

The present disclosure relates to the field of mobile positioning technologies, and in particular, to a method and an apparatus for establishing a positioning network.

BACKGROUND

In the related art, a technology for implementing centimeter-level high-precision positioning has two technology lines, which are differential positioning and precise point positioning (PPP). Differential positioning technologies may include a real-time kinematic (RTK) technology. The RTK technology may further include single-baseline RTK and network RTK.

The RTK technology is a common high-precision satellite positioning method in which satellite positioning signals are received and processed simultaneously by using a base station and a user equipment and accurate position information of the user equipment is obtained. The base station may be an RTK positioning base station (briefly referred to as the base station) built at a fixed location and capable of receiving satellite positioning signals, and the user equipment is also capable of receiving satellite positioning signals. During positioning, the base station forms positioning corrections based on observation signals of the base station and sends the positioning corrections to the user equipment. After receiving the positioning corrections, the user equipment may correct errors of observation signals of the user equipment according to the observation signals of the user equipment and the positioning corrections, to obtain accurate position signals. An RTK positioning system may achieve centimeter-level positioning precision in real time when receiving good signals. The RTK positioning is generally positioning by using a carrier phase real-time kinematic method. As a major milestone of application of GPS, the RTK positioning brings a new measurement principle and method for engineering sample release, topographic mapping, and various control measurements, which greatly improves the operating efficiency. In the RTK positioning system, a distance between the base station and the user equipment is referred to as a baseline. Two ends of the base station are one base station and one user equipment, and the user equipment receives positioning corrections from the base station. Therefore, the RTK positioning system may also be referred to as a single-baseline RTK system.

The network RTK includes a reference station, a mobile station, a data processing center (server), and a data communication line. Station coordinates of the reference station should be accurate and known, and the coordinates of the reference station may be determined by using a long-period GPS static relative positioning method. The reference station should perform continuous observation at a specified sampling rate and transmit observed data to the data processing center through the data communication line. The mobile station needs to transmit a position of the mobile station to the server, and then the server calculates a virtual base station according to data of the base station and data of the mobile station. The mobile station performs positioning by using data of the virtual base station.

The PPP may implement millimeter-level to decimeter-level high-precision positioning based on carrier phase observations and by using a single global navigation satellite system (GNSS) receiver and precise ephemeris and satellite clock bias provided by the international GNSS service (IGS) organization.

The PPP has the advantages of wide coverage and being suitable for a large amount of users and disadvantages of large one-time investment caused by the need of a global ground tracking station system, controlling a server, renting a satellite broadcast channel, and the like and a long convergence time caused by a complex algorithm by delivering data by broadcast.

SUMMARY

In view of this, the present disclosure provides a method and an apparatus for establishing a positioning system. A positioning network is gradually established through single-baseline RTK, requirements of users may be satisfied with less investment when there are fewer users in the early stage, and the network is gradually formed with the increase of users, so that more users can be covered by using fewer base stations.

According to an aspect of the present disclosure, a method for establishing a positioning system is provided, the method including:
  connecting, if a distance between a new node and an established node meets a connection condition, the new node to the established node;
  determining, if the new node is connected to two or more established nodes, whether the two or more established nodes include a node that is in a sub-network; and
  adding, if the two or more established nodes include the node that is already in the sub-network, the new node and the nodes connected to the new node to the sub-network.

In a possible implementation, the method further includes:
  determining whether at least two connected nodes exist in the two or more established nodes; and
  forming, if the two or more established nodes do not include a node that is already in the sub-network but the at least two connected nodes exist in the two or more established nodes, a sub-network among the new node and the at least two connected nodes.

In a possible implementation, the method further includes:
  connecting, if the new node is capable of being added to two or more sub-networks, the two or more sub-networks by the new node.

In a possible implementation, the method further includes:
  determining, when an obtaining request sent by a mobile station is received, whether the mobile station is within coverage of any sub-network according to position information of the mobile station carried in the obtaining request, calculating, if the mobile station is within coverage of one sub-network, a virtual base station according to the position information of the mobile station and position information of a base station in the sub-network, and returning information about the virtual base station to the mobile station, so that the mobile station performs positioning by using the virtual base station.

In a possible implementation, the method further includes:
obtaining, if the positioning system includes a base station working in a single-baseline RTK mode and a base station working in a network RTK mode, and when an obtaining request sent by the mobile station is received, a base station of which distance to the mobile station is within a preset distance according to position information of the mobile station carried in the obtaining request, and determining, according to the position information of the mobile station and coverage of sub-networks, whether the mobile station falls within coverage of one sub-network;
calculating, if one or more base stations of which distances to the mobile station are within the preset distance are obtained and the mobile station falls within the coverage of the sub-network, the virtual base station according to the position information of the mobile station and position information of a plurality of base stations in the sub-network; and selecting one base station to which the mobile station subscribes from the one or more base stations of which the distances to the mobile station are within the preset distance and the virtual base station.

According to another aspect of the present disclosure, an apparatus for establishing a positioning system is provided, the apparatus including:
a connecting module, configured to connect, if a distance between a new node and an established node meets a connection condition, the new node to the established node;
a first determining module, configured to determine, if the new node is connected to two or more established nodes, whether the two or more established nodes include a node that is in a sub-network; and
a network establishing module, configured to add, if the two or more established nodes include the node that is already in the sub-network, the new node and the nodes connected to the new node to the sub-network.

In a possible implementation, the apparatus further includes:
a second determining module, configured to determine whether at least two connected nodes exist in the two or more established nodes; and
the network establishing module being further configured to form, if the two or more established nodes do not include a node that is already in the sub-network but the at least two connected nodes exist in the two or more established nodes, a sub-network among the new node and the at least two connected nodes.

In a possible implementation, the apparatus further includes:
a network connecting module, configured to connect, if the new node is capable of being added to two or more sub-networks, the two or more sub-networks by the new node.

In a possible implementation, the apparatus further includes:
a network RTK module, configured to determine, when an obtaining request sent by a mobile station is received, whether the mobile station is within coverage of any sub-network according to position information of the mobile station carried in the obtaining request, calculate, if the mobile station is within coverage of one sub-network, a virtual base station according to the position information of the mobile station and position information of a base station in the sub-network, and return information about the virtual base station to the mobile station, so that the mobile station performs positioning by using the virtual base station.

In a possible implementation, the apparatus further includes:
a third determining module, configured to obtain, if the positioning system includes a base station working in a single-baseline RTK mode and a base station working in a network RTK mode, and when an obtaining request sent by the mobile station is received, a base station of which distance to the mobile station is within a preset distance according to position information of the mobile station carried in the obtaining request, and determine, according to the position information of the mobile station and coverage of sub-networks, whether the mobile station falls within coverage of one sub-network;
the network RTK module being further configured to calculate, if one or more base stations of which distances to the mobile station are within the preset distance are obtained and the mobile station falls within the coverage of the sub-network, the virtual base station according to the position information of the mobile station and position information of a plurality of base stations in the sub-network; and
a selection module, configured to select one base station to which the mobile station subscribes from the one or more base stations of which the distances to the mobile station are within the preset distance and the virtual base station.

According to another aspect of the present disclosure, a method for establishing a positioning network is provided, the positioning network is applied to a positioning system, the positioning network comprises a data processing center and at least one reference station, one node in the positioning network represents one reference station, and the method including:
determining, if the first historical positioning network capable of forming the new positioning network with the newly added node exists in the network list of the data processing center, whether the newly added node forms the new positioning network with the first historical positioning network; and
determining, if the network list does not exist in the data processing center, whether the newly added node is capable of forming a new positioning network with nodes in the first node information list.

In a possible implementation, before the step of determining, if a first historical positioning network capable of forming a new positioning network with a newly added node exists in a network list of the data processing center, whether the newly added node forms the new positioning network with the first historical positioning network, the method further including:
receiving, by the data processing center, node information of a newly added node, and storing the node information in a first node information list.

In a possible implementation, before the step of determining, if a first historical positioning network capable of forming a new positioning network with a newly added node exists in a network list of the data processing center, whether the newly added node forms the new positioning network with the first historical positioning network, the method further including:

determining a position relationship between the newly added node and a second historical positioning network in a network list;

determining, according to the position relationship and by using a preset rule, a first historical positioning network capable of forming a new positioning network with the newly added node from the second historical positioning network.

In a possible implementation, the first node information list comprising at least two nodes that are not capable of forming a network currently.

In a possible implementation, determining, according to the position relationship and by using a preset rule, a first historical positioning network capable of forming a new positioning network with the newly added node from the second historical positioning network comprising:

determining, if the position relationship is that the newly added node is located inside the second historical positioning network, that the second historical positioning network is the first historical positioning network capable of forming the new positioning network with the newly added node.

In a possible implementation, determining, according to the position relationship and by using a preset rule, a first historical positioning network capable of forming a new positioning network with the newly added node from the second historical positioning network comprising:

determining, according to a first preset rule if the position relationship is that the newly added node is located outside the second historical positioning network, whether the first historical positioning network capable of forming the new positioning network with the newly added node exists in the network list of the data processing center, wherein the first preset rule is: determining whether at least two nodes of which distances to the newly added node are less than a first preset value exist among N nodes forming a second historical positioning network; and determining, if the at least two nodes of which the distances to the newly added node are less than the first preset value exist among the N nodes forming the second historical positioning network, that the first historical positioning network capable of forming the new positioning network with the newly added node exists in the network list, and adding, if at least two nodes of which the distances to the newly added node are less than the first preset value do not exist among the N nodes forming the second historical positioning network, the newly added node to the first node information list, wherein N is a positive integer.

In a possible implementation, if at least two first historical positioning networks meeting the first preset rule existing in the network list, the at least two first historical positioning networks and the newly added node forming a new positioning network.

In a possible implementation, determining whether the newly added node forms a new positioning network with the first historical positioning network comprising:

determining, according to the preset rule of the data processing center, whether the newly added node forms the new positioning network with the first historical positioning network, or indicating, according to a user instruction, whether the newly added node forms the new positioning network with the first historical positioning network.

In a possible implementation, the newly added node and all nodes forming the first historical positioning network forming a new network according to a Delaunay triangulation algorithm.

In a possible implementation, determining whether the newly added node is capable of forming a new positioning network with nodes in the first node information list comprising:

determining, according to a second preset rule, whether the newly added node is capable of forming a new positioning network with the nodes in the first node information list, wherein the second preset rule is: determining whether at least two nodes that form at least a triangle with the newly added node exist in the first node information list, wherein a length of each edge of the triangle is less than or equal to a second preset value; and adding, if the at least two nodes exist, the newly added node and node information of the at least two nodes to the network list, and adding, if at least two nodes do not exist, the newly added node to the first node information list.

In a possible implementation, after adding the newly added node and node information of the at least two nodes to the network list, the method further comprising:

determining whether the newly added node forms the new positioning network with the nodes; and the determining whether the newly added node forms the new positioning network with the nodes comprising:

determining, according to the preset rule of the data processing center, whether the newly added node forms the new positioning network with the nodes, or indicating, according to a user instruction, whether the newly added node forms the new positioning network with the nodes.

In a possible implementation, the newly added node and the nodes forming the new network according to a Delaunay triangulation algorithm.

In a possible implementation, the method further comprising:

receiving, by the data processing center, a position recommendation request sent by a user;

obtaining, in response to the position recommendation request, a recommended position based on position information of the first historical positioning network or the second historical positioning network or position information of the nodes in the first node information list; and sending, according to a preset newly added node position and the recommended position, the recommended position and/or the preset newly added node position to the user, wherein the preset newly added node position is a position at which the user expects to establish a node.

In a possible implementation, the method further comprising:

obtaining, by the data processing center, a recommended position based on position information of at least two historical positioning networks in the network list, and sending the recommended position to a user.

In a possible implementation, obtaining a recommended position based on position information of historical positioning networks comprising:

selecting at least two historical positioning networks from the network list of the data processing center; and determining whether a distance between circumscribed circles of the two historical positioning networks is less than a third preset value, and using, if the distance is less than the third preset value, a position of an intersection formed on a two-dimensional plane and formed by drawing a circle by using a center of circle of a circumscribed circle of each historical positioning network as a center of circle and a sum of a radius of the circumscribed circle and a fourth preset value as a radius as the recommended position.

In a possible implementation, obtaining a recommended position based on position information of the nodes in the first node information list comprising: using a position of a node capable of forming a network with at least two nodes in the first node information list as the recommended position.

In a possible implementation, sending, according to a preset newly added node position and the recommended position, the recommended position and/or the preset newly added node position to the user comprising:
  determining whether the preset newly added node position coincides with the recommended position, sending the recommended position to the user if the preset newly added node position coincides with the recommended position, and sending the preset newly added node position and the recommended position to the user if the preset newly added node position does not coincide with the recommended position.

According to another aspect of the present disclosure, a method for establishing a positioning network is provided, wherein the positioning network is applied to a positioning system, the positioning network comprises a data processing center and at least one reference station, one node in the positioning network represents one reference station, and the method comprises:
  determining whether a newly added node is capable of forming a new positioning network with nodes in a first node information list;
  determining, if the newly added node is not capable of forming the new positioning network with the nodes in the first node information list, whether a network list exists in the data processing center; and
  determining, if the network list exists in the data processing center and a first historical positioning network capable of forming a new positioning network with the newly added node exists in the network list, whether the newly added node forms the new positioning network with the first historical positioning network.

In a possible implementation, after determining whether a network list exists in the data processing center, the method further comprising:
  determining a position relationship between the newly added node and a second historical positioning network in the network list; and
  determining, according to the position relationship and by using a preset rule, the first historical positioning network capable of forming the new positioning network with the newly added node from the second historical positioning network.

In a possible implementation, determining, according to the position relationship and by using a preset rule, the first historical positioning network capable of forming the new positioning network with the newly added node from the second historical positioning network comprising:
  determining, if the position relationship is that the newly added node is located inside the second historical positioning network, that the second historical positioning network is the first historical positioning network capable of forming the new positioning network with the newly added node.

In a possible implementation, determining, according to the position relationship and by using a preset rule, the first historical positioning network capable of forming the new positioning network with the newly added node from the second historical positioning network comprising: determining, according to a first preset rule if the position relationship is that the newly added node is located outside the second historical positioning network, whether the first historical positioning network capable of forming the new positioning network with the newly added node exists in the network list of the data processing center, wherein
  the first preset rule is: determining whether at least two nodes of which distances to the newly added node are less than a first preset value exist among N nodes forming a second historical positioning network; and determining, if the at least two nodes of which the distances to the newly added node are less than the first preset value exist among the N nodes forming the second historical positioning network, that the first historical positioning network capable of forming the new positioning network with the newly added node exists in the network list, and adding, if at least two nodes of which the distances to the newly added node are less than the first preset value do not exist among the N nodes forming the second historical positioning network, the newly added node to the first node information list, wherein N is a positive integer.

In a possible implementation, if at least two first historical positioning networks meeting the first preset rule existing in the network list, the at least two first historical positioning networks and the newly added node forming a new positioning network.

In a possible implementation, determining whether the newly added node forms a new positioning network with the first historical positioning network comprising:
  determining, according to the preset rule of the data processing center, whether the newly added node forms the new positioning network with the first historical positioning network, or indicating, according to a user instruction, whether the newly added node forms the new positioning network with the first historical positioning network.

In a possible implementation, newly added node and all nodes forming the first historical positioning network forming a new network according to a Delaunay triangulation algorithm.

In a possible implementation, determining whether the newly added node is capable of forming a new positioning network with nodes in the first node information list comprising: determining, according to a second preset rule, whether the newly added node is capable of forming a new positioning network with the nodes in the first node information list, wherein
  the second preset rule is: determining whether at least two nodes that form at least a triangle with the newly added node exist in the first node information list, wherein a length of each edge of the triangle is less than or equal to a second preset value; and adding, if the at least two nodes exist, the newly added node and node information of the at least two nodes to the network list, and adding, if at least two nodes do not exist, the newly added node to the first node information list.

In a possible implementation, after the adding the newly added node and node information of the at least two nodes to the network list, the method further comprising: determining whether the newly added node forms the new positioning network with the nodes; and the determining whether the newly added node forms the new positioning network with the nodes comprising:
determining, according to the preset rule of the data processing center, whether the newly added node forms the new positioning network with the nodes, or indicating, according to a user instruction, whether the newly added node forms the new positioning network with the nodes.

In a possible implementation, newly added node and all nodes forming the first historical positioning network forming a new network according to a Delaunay triangulation algorithm.

In a possible implementation, the method further comprising:
receiving, by the data processing center, a position recommendation request sent by a user;
obtaining, in response to the position recommendation request, a recommended position based on position information of the first historical positioning networks or the second historical positioning networks or position information of the nodes in the first node information list; and
sending, according to a preset newly added node position and the recommended position, the recommended position and/or the preset newly added node position to the user, wherein the preset newly added node position is a position at which the user expects to establish a node.

In a possible implementation, obtaining a recommended position based on position information of historical positioning networks comprising:
selecting at least two historical positioning networks from the network list of the data processing center; and
determining whether a distance between circumscribed circles of the two historical positioning networks is less than a third preset value, and using, if the distance is less than the third preset value, a position of an intersection formed on a two-dimensional plane and formed by drawing a circle by using a center of circle of a circumscribed circle of each historical positioning network as a center of circle and a sum of a radius of the circumscribed circle and a fourth preset value as a radius as the recommended position.

In a possible implementation, obtaining a recommended position based on position information of the nodes in the first node information list comprising: using a position of a node capable of forming a network with at least two nodes in the first node information list as the recommended position.

According to another aspect of the present disclosure, a positioning method is provided, using the positioning network, wherein the positioning network comprises a data processing center and at least one reference station, one node in the positioning network represents one reference station, and the positioning method comprising:
sending, by a mobile station, a positioning request to the data processing center, wherein the positioning request carries position information of the mobile station;
sending, in response to the positioning request, positioning data to the mobile station based on the position information of the mobile station and coverage of each positioning network in a network list; and
performing, by the mobile station, positioning according to the positioning data.

In a possible implementation, if the mobile station is within coverage of a positioning network, the sending positioning data to the mobile station comprising:
calculating a virtual node according to the position information of the mobile station and position information of nodes in the positioning network, sending node information of the virtual node to the mobile station, and performing, by the mobile station, positioning according to positioning data sent by the virtual node.

In a possible implementation, if the mobile station is outside coverage of a positioning network, the sending positioning data to the mobile station comprising:
determining at least one first node meeting a third preset rule from a plurality of nodes in the positioning network, sending node information of the first node to the mobile station, and performing, by the mobile station, positioning according to positioning data sent by the node, wherein
the third preset rule is determining a first node that is nearest to the mobile station from the plurality of nodes in the positioning network. In a possible implementation, the positioning data is corrected positioning data of the virtual node or the first node for the mobile station.

According to another aspect of the present disclosure, an apparatus for establishing a positioning system is provided, wherein the positioning network is applied to a positioning system, the positioning network comprises a data processing center and at least one reference station, one node in the positioning network represents one reference station, and the apparatus comprises:
a first establishing module, configured to determine, if a first historical positioning network capable of forming a new positioning network with a newly added node exists in a network list of the data processing center, whether the newly added node forms the new positioning network with the first historical positioning network; and
a second establishing module, configured to determine, if the network list does not exist in the data processing center, whether the newly added node is capable of forming a new positioning network with nodes in a first node information list.

In a possible implementation, the apparatus further includes:
a position determining unit, configured to determine a position relationship between the newly added node and a second historical positioning network in the network list; and
a network determining unit, configured to determine, according to the position relationship and by using a preset rule, the first historical positioning network capable of forming the new positioning network with the newly added node from the second historical positioning network.

In a possible implementation, the network determining unit is further configured to determine, if the position relationship is that the newly added node is located inside the second historical positioning network, that the second historical positioning network is the first historical positioning network capable of forming the new positioning network with the newly added node.

In a possible implementation, the network determining unit is further configured to determine, according to a first preset rule if the position relationship is that the newly added node is located outside the second historical positioning network, whether the first historical positioning network capable of forming the new positioning network with the newly added node exists in the network list of the data processing center, where the first preset rule is: determining whether at least two nodes of which distances to the newly added node are less than a first preset value exist among N nodes forming a second historical positioning network; and determine, if the at least two nodes of which the distances to the newly added node are less than the first preset value exist among the N nodes forming the second historical positioning network, that the first historical positioning network capable of forming the new positioning network with the newly added node exists in the network list, and add, if at least two nodes of which the distances to the newly added node are less than the first preset value do not exist among the N nodes forming the second historical positioning network, the newly added node to the first node information list, where N is a positive integer.

In a possible implementation, the second establishing module includes:
 a determining unit, configured to determine, according to a second preset rule, whether the newly added node is capable of forming the new positioning network with the nodes in the first node information list, where
 the second preset rule is: determining whether at least two nodes that form at least a triangle with the newly added node exist in the first node information list, where a distance of each edge of the triangle is less than or equal to a second preset value; and add, if the at least two nodes exist, the newly added node and node information of the at least two nodes to the network list, and add, if the at least two nodes do not exist, the newly added node to the first node information list.

In a possible implementation, the second establishing module further includes:
 a networking determining module, configured to determine whether the newly added node forms the new positioning network with the nodes.

In a possible implementation, the apparatus further includes:
 a receiving module, configured to receive a position recommendation request sent by a user;
 a position recommendation module, configured to obtain, in response to the position recommendation request, a recommended position based on position information of the historical positioning networks or position information of the nodes in the first node information list; and
 a sending module, configured to send, according to a preset newly added node position and the recommended position, the recommended position and/or the preset newly added node position to the user, where the preset newly added node position is a position at which the user expects to establish a node.

According to an aspect of the present disclosure, an apparatus for establishing a positioning network is provided, wherein the positioning network is applied to a positioning system, the positioning network comprises a data processing center and at least one reference station, one node in the positioning network represents one reference station, and the apparatus comprising:
 a second establishing module, configured to determine whether a newly added node is capable of forming a new positioning network with nodes in a first node information list;
 a determining module, configured to determine, if the newly added node is not capable of forming the new positioning network with the nodes in the first node information list, whether a network list exists in the data processing center; and
 a first establishing module, configured to determine, if the network list exists in the data processing center and a first historical positioning network capable of forming a new positioning network with the newly added node exists in the network list, whether the newly added node forms the new positioning network with the first historical positioning network.

According to an aspect of the present disclosure, a positioning apparatus is provided, using the positioning network, where the positioning network includes a data processing center and at least one reference station, and one node in the positioning network represents one reference station, and the positioning apparatus includes:
 a request sending module of a mobile station, configured to send a positioning request to the data processing center, where the positioning request carries position information of the mobile station;
 a response module of the data processing center, configured to send, in response to the positioning request, positioning data to the mobile station based on the position information of the mobile station and coverage of each positioning network in a network list; and
 a positioning module of the mobile station, configured to perform positioning according to the positioning data.

In a possible implementation, if the mobile station is within coverage of a positioning network, the response module is further configured to calculate a virtual node according to the position information of the mobile station and position information of nodes in the positioning network, and send node information of the virtual node to the mobile station; and
 the positioning module is further configured to perform positioning according to positioning data sent by the virtual node.

In a possible implementation, if the mobile station is outside the coverage of the positioning network, the response module is further configured to:
 determine at least one first node meeting a third preset rule from a plurality of nodes in the positioning network, and send node information of the first node to the mobile station; and
 the positioning module is further configured to perform positioning according to positioning data sent by the node, where
 the third preset rule is determining a first node that is nearest to the mobile station from the plurality of nodes in the positioning network.

In a possible implementation, the positioning data is corrected positioning data of the virtual node or the first node for the mobile station.

According to another aspect of the present disclosure, an apparatus for establishing a positioning network is provided, the apparatus including: a processor; and a memory, configured to store instructions executable by the processor, where the processor is configured to perform the method for establishing a positioning network.

According to another aspect of the present disclosure, a non-volatile computer-readable storage medium is provided, storing computer program instructions, where the computer program instructions, when being executed by a processor, implement the method for establishing a positioning network.

According to another aspect of the present disclosure, a positioning apparatus is provided, including: a processor;

and a memory configured to store instructions executable by the processor, where the processor is configured to perform the positioning method.

According to another aspect of the present disclosure, a non-volatile computer-readable storage medium is provided, storing computer program instructions, where the computer program instructions, when being executed by a processor, implement the positioning method.

RTK base stations are developed and established by a distributor. The RTK base station provides a positioning service to a user equipment (the user equipment in the present disclosure is also referred to as a mobile station) by using a single-baseline positioning technology. When the established RTK base stations meet a networking condition, a network RTK is formed, and a server may communicate with each RTK base station and run a network RTK algorithm.

According to the method for establishing a high-precision positioning system of the present disclosure, network RTK may be gradually established. In addition, a user may use a single-baseline RTK positioning service before the network RTK is formed, and the network RTK is formed once a networking condition is met. A positioning network is gradually established through single-baseline RTK, requirements of users may be satisfied with less investment when there are fewer users in the early stage, and the network is gradually formed with the increase of users, so that more users can be covered by using fewer base stations.

Exemplary embodiments are described below in detail with reference to the accompanying drawings, and other features and aspects of the present disclosure will become clearer.

BRIEF DESCRIPTION OF THE DRAWINGS

The accompanying drawings, which are incorporated in the specification and constitute a part of the specification, show exemplary embodiments, features, and aspects of the present disclosure together with the specification and are used for explaining the principle of the present disclosure.

FIG. 2 is a diagram of information exchanging between devices in a system in a positioning system establishing process according to an embodiment of the present disclosure.

FIG. 3*a* to FIG. 3*d* are schematic diagrams of node connection relationships according to some embodiments of the present disclosure.

DETAILED DESCRIPTION

Figure 1:
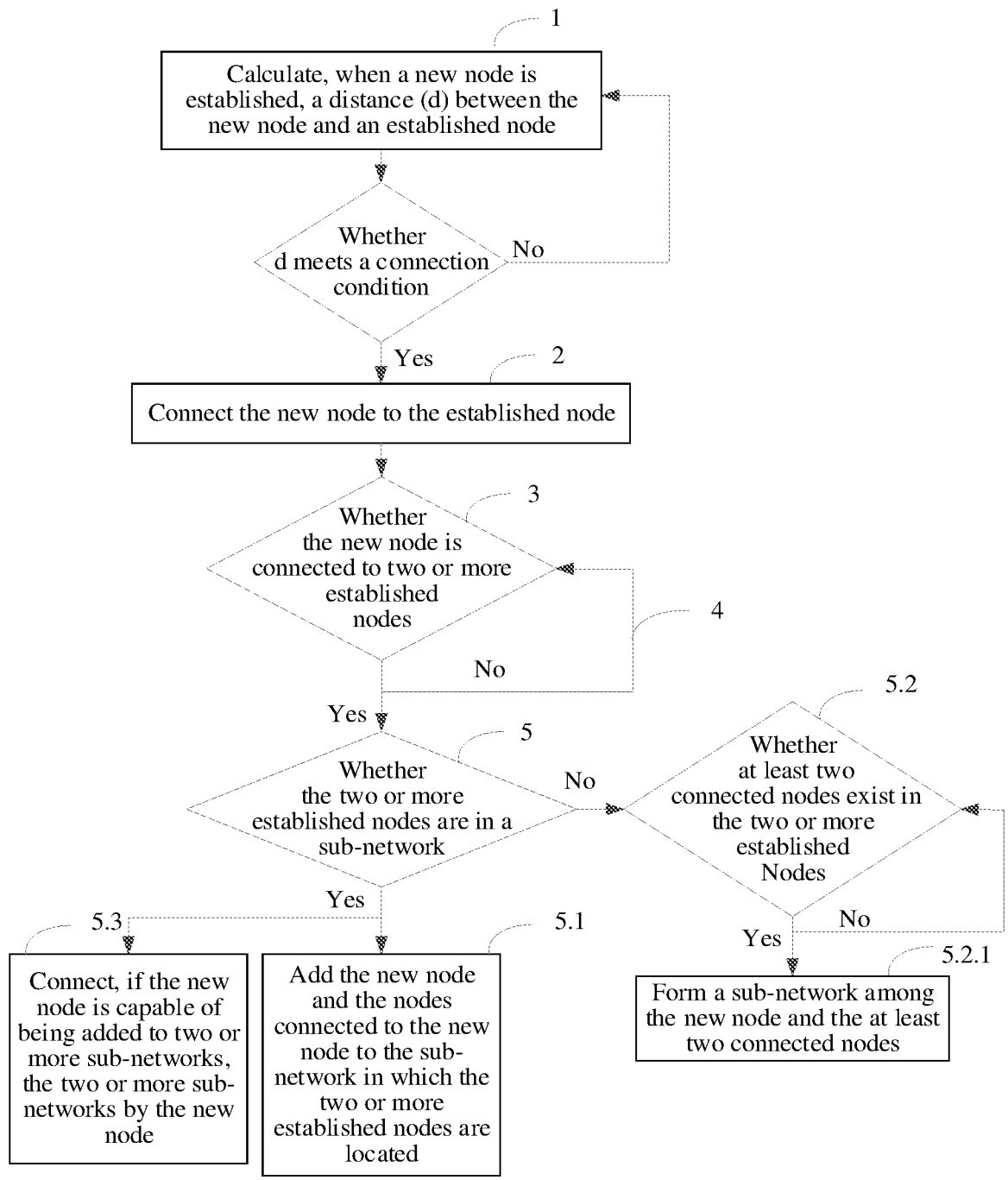
FIG. 1 is a flowchart of a method for establishing a positioning system according to an embodiment of the present disclosure.

Various exemplary embodiments, features, and aspects of the present disclosure are described below in detail with reference to the accompanying drawings. The same reference numerals in the accompanying drawings represent elements with same or similar functions. Although various aspects of the embodiments are shown in the accompanying drawings, unless specifically noted otherwise, the accompanying drawings are not necessarily drawn to scale.

The dedicated word "exemplary" used herein means "serving as an example, an embodiment, or description". Any embodiment described as "exemplary" herein should not be interpreted as being more preferred or better than another embodiment.

In addition, to better describe the present disclosure, many specific details are stated in the following specific implementations. A person skilled in the art should understand that the present disclosure may still be implemented without some specific details. In some embodiments, methods, means, elements, and circuits well known to a person skilled in the art are not described in detail, to highlight the main idea of the present disclosure.

A single-baseline RTK user equipment performs positioning by using data of a single RTK base station. As a distance between the user equipment and the RTK base station increases, positioning precision is reduced. If positioning in a relatively large range needs to be supported, a relatively large quantity of RTK base stations need to be established. With a network RTK, positioning in the relatively large range can be covered by using few base stations. However, two-way data transmission is used for communication, and the communication requires a relatively large bandwidth and a large amount of calculation when there are many users. In the related art, service regions are divided into grids in advance, and various grid virtual base stations are pre-calculated and allocated according to a position of a user equipment (a grid to which the user equipment belongs), to reduce requirements of the network RTK for the bandwidth and the amount of calculation.

Service networks need to be pre-established for existing commercial PPP and network RTK, and then fees are charged in users. Due to large investment in network establishment, high fees are charged in the users, affecting use enthusiasm of the users and hindering the growth of a quantity of users. In addition, the quantity of users grows slowly and the quantity is small, which in turn affects reduction of the fees, forming a vicious cycle.

With the growth of users, this application needs to achieve the objectives of building as few base stations as possible, covering as many users as possible by gradually forming a reference station network, and making proper use of resources.

For the above technical problems, the present disclosure provides a method and an apparatus for establishing a positioning system.

The method for establishing a positioning system of the present disclosure may include the following steps.

RTK base stations are developed and established by a distributor. The RTK base station provides a positioning service to a user equipment (the user equipment in the present disclosure is also referred to as a mobile station) by using a single-baseline positioning technology. When the established RTK base stations meet a networking condition, network RTK is formed, and a server may communicate with each RTK base station and run a network RTK algorithm. According to the method for establishing a high-precision positioning system of the present disclosure, network RTK may be gradually established. In addition, a user may use a single-baseline RTK positioning service before the network RTK is formed, and the network RTK is formed once a networking condition is met.

A positioning network is gradually established through single-baseline RTK, requirements of users may be satisfied with less investment when there are fewer users in the early stage, and the network is gradually formed with the increase of users, so that more users can be covered by using fewer base stations.

For ease of description, in the present disclosure, a base station or a base station in network RTK is referred to as a node, and the base station in the present disclosure may be an RTK base station. FIG. 1 is a flowchart of a method for establishing a positioning system according to an embodiment of the present disclosure. As shown in FIG. 1, a specific process may include the following steps.

1. Calculate, when a new node is established, a distance between the new node and an established node.
2. Connect, if the distance between the new node and the established node meets a connection condition, the new node to the established node.
3. Determine whether the new node is connected to two or more established nodes.
4. Return to step 3 to perform the determination again if the new node is not connected to the two or more established nodes.
5. Determine, if the new node is connected to the two or more established nodes, whether the two or more established nodes include a node that is in a sub-network.
5.1. Add, if the two or more established nodes include the node that is already in the sub-network, the new node and the nodes connected to the new node to the sub-network.
5.2. Determine, if the two or more established nodes do not include a node that is already in the sub-network, whether at least two connected nodes exist in the two or more established nodes. 5.2.1. Form, if the at least two connected nodes exist, a sub-network among the new node and the at least two connected nodes. 5.2.2. Return to step 5.2 to continue to determine whether at least two connected nodes exist in the two or more established nodes if at least two connected nodes do not exist.
5.3. Connect, if the new node is capable of being added to two or more sub-networks, the two or more sub-networks by the new node.

A positioning system includes a server. A processor may be disposed on the server. The steps may be performed by the server or the processor on the server. In the present disclosure, the processor may be a general purpose processor. For example, the processor may be a central processing unit (CPU) or a graphics processing unit (GPU). In the present disclosure, the processor may alternatively be a field programmable gate array (FPGA) chip running an executable program. The processor is not specifically limited in the present disclosure.

When a new node is established, a registration request may be sent to the server for registration. After receiving the registration request, the server may perform steps such as calculation and determining according to the registration request and registration information of established nodes locally stored in the server.

In a possible implementation, the registration request may include device information of a base station. The device information of the base station may include identifier information and position information of the base station. After receiving the identifier information and the position information of the base station sent by the base station, the server locally stores the identifier information and the position information. In a possible implementation, the server may locally maintain a base station device information table. As shown in Table 1, identifier information, position information, and the like of a base station may be recorded in the base station device information table. The position information of the base station may be information represented by latitude and longitude coordinates or represented by other coordinates used for positioning. This is not limited in the present disclosure. The identifier information of the base station may be information that identifies only one base station, for example, may be a number of the base station. A served mobile station or a user equipment may be represented by using identifier information of the mobile station or the user equipment, and a sub-network to which the base station belongs may be represented by using an identifier of the sub-network. A working mode of a base station may further be recorded in the base station device information table. For example, the base station may work in a single-baseline RTK mode or a network RTK mode.

Therefore, the server may search the established nodes for a node of which distance to a new node meets a connection condition. The server may calculate distances between the new node and the established nodes according to position information of the new node and position information of the established nodes and determine whether the distances meet the connection condition.

TABLE 1

Base station device information table

| Identifier information of base station | Position information | Served mobile station/user equipment | Belonged sub-network |
| --- | --- | --- | --- |
| Base station 1 | P1 | Rover2 | 0_ |
| Base station 2 | P2 | Rover3 | 0_ |
| ... | ... | ... | ... |

The connection condition may refer to that a distance between a new node and an established node is less than a preset distance threshold. For example, a distance D between a new node and an established node is less than Dmax, where Dmax may represent the preset distance threshold.

For step 2, if all the distances between the new node and the established nodes do not meet the connection condition, the new node may be used as an established node, and it is determined whether a distance between the established node and a new node meets the connection condition.

A sub-network may be network RTK that has been formed. That is, some established nodes already form the network RTK before the new node is established. A network formed by the nodes that already form the network RTK is referred to as the sub-network. There may be one or more sub-networks in a system, and coverage of a plurality of sub-networks does not overlap with each other. When coverage of two sub-networks overlaps, the two sub-networks may be merged into one sub-network. The case that the coverage overlaps may include the case in step 5.3 described above.

In a possible implementation, the server may locally maintain a network information table. Information such as an identifier of a sub-network, nodes included in the sub-network, and coverage of the sub-network may be recorded in entries of the network information table, as shown in Table 2.

TABLE 2

Network information table

| Identifier of sub-network | Included nodes | Coverage | |
|---|---|---|---|
| Sub-network 1 | Node 1, node 2, and node 4 | | |
| Sub-network 2 | Nodes 5-8 | | |
| ... | ... | ... | ... |

The coverage of the sub-network may be represented by using a plurality of latitude and longitude coordinates or may be represented in a form of center coordinates and a radius. The representation manner of the coverage is not limited in the present disclosure. A process of merging two sub-networks into one sub-network may be implemented in the following manner: creating a new entry in the network information table, and recording an identifier of a new sub-network, nodes included in the new sub-network, coverage of the new sub-network, and the like. The server may alternatively delete the merged sub-network.

It should be noted that a sequence or a process in FIG. 1 is merely an example in the present disclosure, which is not limited in the present disclosure. For example, determining processes of step 5 and step 5.2 may be performed simultaneously, and a next operation is performed according to a result of the determining.

In a possible implementation, if the result of the determining in step 5 is that the two or more established nodes include the node that is in the sub-network, the new node and the nodes connected to the new node may be directly added to the sub-network or the new node is connected to the sub-network to form a new sub-network, and the nodes connected to the new node are added to the new sub-network regardless of whether the at least two connected nodes exist in the two or more established nodes.

For step 5.2.1, forming a sub-network among the new node and the at least two connected nodes may mean that the server may create an identifier of the sub-network for the sub-network and record information such as nodes included in the sub-network and coverage of the sub-network.

FIG. 2 is a diagram of information exchanging between devices in a system in a positioning system establishing process according to an embodiment of the present disclosure. A process of establishing a positioning system of the present disclosure is described by using an example.

For the method for establishing a positioning system, for example, after a new node is established, the node may be registered. A specific process may be as follows. After being powered on, a base station may send a registration request to a cloud server for registering device information of the base station. The device information of the base station may include identifier information and position information of the base station. The base station may send the identifier information and the position information of the base station to a cloud. After receiving the identifier information and the position information of the base station sent by the base station, the cloud locally stores the identifier information and the position information of the base station in the cloud.

As shown in FIG. 2, after being powered on, a base station sends device information to a cloud server. Specifically, after being powered on, the base station may obtain position information of a current position of the base station from a satellite (for example, a GPS). The base station sends a registration request to the cloud server. The registration request carries identifier information of the base station and the position information of the base station. After receiving the registration request, the cloud server may store the identifier information and the position information of the base station in a cloud database.

In a possible implementation, storage may be performed in the form of a table (the base station device information table). Identifier information, position information, and the like of one base station are recorded in one entry. In a possible implementation, information, for example, identifier information and position information of a mobile station, about the mobile station served by a base station may further be recorded in the entry, that is, a subscription list. When a base station has just been registered and has not served a mobile station, a corresponding position for recording the mobile station served by the base station in an entry may be set to empty.

After processing the registration request sent by the base station, the cloud server may return a registration status to the base station. For example, after recording the device information of the base station according to the registration request sent by the base station, the cloud server returns a registration success, or when information in the registration request is not comprehensive or has other problems, and registration cannot be completed, the cloud server may return a registration failure.

After receiving the registration status returned by the cloud server, and if the registration status is successful registration, the base station may be connected to the cloud server and send a differential message at a specific frequency.

After the registration succeeds, the cloud server may determine, according to the method shown in FIG. 1, whether a distance between a new node and an established node meets a connection condition. If the newly registered base station is a first node, there is no currently established node, and a result of the determining is that the distance between the new node and the established node does not meet the connection condition. In this case, the new node works in a single-baseline RTK mode. If when receiving an obtaining request sent by the mobile station for obtaining base station information, the obtaining request may include position information of the mobile station, the cloud server may determine a base station of which distance to the mobile station is within a preset distance according to the position information of the mobile station and position information of stored base stations. If the distance between the new node and the mobile station is within the preset distance, the cloud server may return device information of the new node to the mobile station, and the mobile station may subscribe to the new node, for example, returning a subscription confirmation message to the cloud server. After receiving the subscription confirmation message, the cloud server may record the device information such as the identifier information and the position information of the mobile station in a subscription list of the new node.

If the distance between the new node and the mobile station is not within the preset distance, the cloud server may continue to determine a base station of which distance to the mobile station is within the preset distance according to the position information of the mobile station and the position information of the stored base stations until a base station that can provide a positioning service to the mobile station is determined, and return device information of the base station to the mobile station.

In a possible implementation, if the cloud server searches entries of the base station device information table for a plurality of base stations of which distances to the mobile station are within the preset distance, the cloud server may determine, from the plurality of base stations, a base station, for example, a base station nearest to the mobile station, to which the mobile station subscribes and return device information of the nearest base station to the mobile station, or the cloud server may return device information of all the plurality of base stations to the mobile station, and the mobile station determines a to-be-subscribed base station. For example, the mobile station may subscribe to a base station nearest to the mobile station and return device information of the subscribed base station to the cloud server. After determining the base station to which the mobile station subscribes or after receiving the device information of the subscribed base station sent by the mobile station, the cloud server may set a subscription list of the base station in the base station device information table and record the device information of the mobile station in the subscription list.

The mobile station may send the obtaining request sent by the mobile station and received by the cloud server for obtaining the base station information to the cloud server after being registered, or when being far away from the subscribed base station, or after the subscribed base station fails. Far away from the subscribed base station or failure of the subscribed base station causes inaccurate positioning of the mobile station. In this case, the mobile station may send the obtaining request to the server again for obtaining a base station providing a service, to improve positioning precision.

For example, as shown in FIG. 2, after being powered on, a mobile station may first enter a pairing mode, is bound to an APP installed on a user equipment (the user equipment may be a terminal device such as a mobile communication terminal or a computer), and may establish a connection and communication with the cloud server through the APP. After being powered on, the mobile station may similarly register device information of the mobile station with the cloud server. The device information of the mobile station may include identifier information and position information of the mobile station. The mobile station may send the identifier information and the position information of the mobile station to the cloud server. Specifically, after being powered on, the mobile station may obtain position information of the mobile station by using a precise point positioning (PPP) technology, that is, a global navigation satellite system (GNSS) receiver may be mounted on the mobile station. The GNSS receiver may receive precise ephemeris and satellite clock bias provided by the international GNSS service (IGS) organization and may perform millimeter-level to decimeter-level high-precision positioning based on carrier phase observations. After obtaining the position information of the mobile station, the mobile station may send a registration request to the cloud server by using the bound APP. The registration request may carry the identifier information and the position information of the mobile station. After receiving the registration request, the cloud server may store the identifier information and the position information of the mobile station in the cloud database. In a possible implementation, storage may be performed in the form of a table (a mobile station device information table). Identifier information, position information, and the like of one mobile station may be recorded in one entry. For example, device information of a base station serving the mobile station may further be stored. For a form of the mobile station device information table, reference may be made to the base station device information table in the foregoing.

In a possible implementation, a correspondence between the base station and the mobile station may not be recorded in the manner of storing the device information of the served mobile station in a device information entry of the base station and storing the device information of the base station serving the mobile station in a device information entry of the mobile station. A dedicated base station-mobile station correspondence table (a service relationship table) may be established to record a service relationship between the base station and the mobile station.

After completing registration, a mobile station may further send a service request to the cloud server (a sending time may alternatively be a time when being far away from a subscribed base station or after a subscribed base station fails). The service request may be used for requesting device information of a base station serving the mobile station. For example, the mobile station may send an obtaining request to the cloud server for obtaining the device information of the base station, the obtaining request carrying position information of the mobile station, to report the position information of the mobile station to the cloud server, so that the cloud server may search the base station device information table according to the position information of the mobile station for a base station of which distance to the mobile station is within the preset distance.

A case that the newly registered base station is the first node is described above. If the newly registered base station is a second node, it may be determined whether a distance between the new node and an established node meets the connection condition. If the distance meets the connection condition, the new node may be connected to the established node. If the distance does not meet the connection condition, the new node may not be connected to the established node. The new node works in the single-baseline RTK mode, and other processes are the same as the case that the newly registered base station is the first node.

FIG. 3a to FIG. 3d are schematic diagrams of node connection relationships according to some embodiments of the present disclosure.

If the newly registered base station is a third node, it may be determined whether a distance between a new node and each of two established nodes meets the connection condition. If a distance between the new node and any node of the two established nodes meets the connection condition, the new node may be connected to the any node. If a distance between the new node and any node of the two established nodes does not meet the connection condition, the new node is not connected to the any node, and the new node works in the single-baseline RTK mode. Other processes are the same as the case that the newly registered base station is the first node.

If the new node establishes a connection with only one node of the two established nodes, as shown in FIG. 3a, it is continuously determined whether the new node is connected to two or more established nodes (step 3). The new node works in the single-baseline RTK mode, and other processes are the same as the case that the newly registered base station is the first node.

If the new node establishes connections with both the two established nodes, as shown in FIG. 3b and FIG. 3c, it is determined that neither of the two established nodes are in a sub-network, and it is determined whether the two established nodes are connected (that is, perform step 5.2). If the two established nodes are already connected, as shown in FIG. 3c, the three nodes may form a sub-network. If the two established nodes are not connected, as shown in FIG. 3b, it may be continuously determined whether the new node is connected to two established nodes that are already connected and the established nodes connected to the new node are in a sub-network until the new node and other nodes form a sub-network or are added to a sub-network, the new node enters a network RTK mode, and the determining process may be ended.

As shown in FIG. 3c, if three nodes form a sub-network, that is, the three nodes are converted to the network RTK mode, three corresponding base stations work in the network RTK mode. The cloud server may maintain working modes of nodes on the server. For example, the three nodes form the sub-network, and the cloud server may create a sub-network identifier for the sub-network and record information such as nodes included in the sub-network and coverage of the sub-network. For example, the cloud server may create a network information table. Information (a sub-network identifier, nodes included in a sub-network, coverage of a sub-network, and the like) about each sub-network that has been formed may be recorded in the network information table. In another possible implementation, the cloud server may further record a working mode such as the network RTK mode or the single-baseline RTK mode of a base station in the base station device information table. Different working modes may be recorded by using corresponding working mode codes or working mode identifiers. For example, 0 may represent the single-baseline RTK, and 1 may represent the network RTK. Alternatively, the cloud server may directly record, in the base station device information table, a sub-network identifier of a sub-network in which a base station is located.

In this way, when receiving an obtaining request sent by a mobile station, the cloud server may determine whether the mobile station is within coverage of any sub-network according to position information of the mobile station. If the mobile station is within coverage of a sub-network, the cloud server may calculate a virtual base station according to the position information of the mobile station and position information of a base station in the sub-network and return information about the virtual base station to the mobile station. The mobile station may perform positioning by using the virtual base station. It may be learned according to the example in FIG. 1 that after the new node is connected to the two or more established nodes, the cloud server may further determine whether the two or more established nodes are in a sub-network. In a possible implementation, the cloud server may determine whether the two or more established nodes are in the sub-network according to the maintained working modes of the nodes. For example, the cloud server may search the network information table to determine whether the two or more established nodes and a sub-network identifier are associatively stored or may determine, in the base station device information table, whether working modes of the two or more established nodes are associated with a sub-network identifier.

As shown in FIG. 1, in step 5, if it is determined that the two or more established nodes are in a sub-network in the foregoing manner, the new node and the nodes connected to the new node may be added to the sub-network in which the two or more established nodes are located. The nodes may be added to the network in the following manner: recording, in the base station device information table, working modes of the nodes or a sub-network identifier of the sub-network in which the nodes are located; or associatively storing identifiers of the nodes with the added sub-network in the network information table. This is not limited in the present disclosure.

Figure 3D:
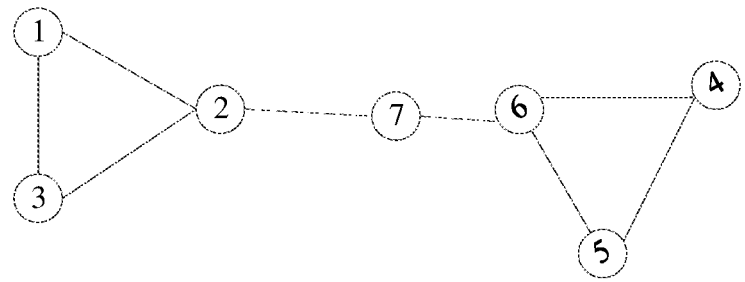

As shown in FIG. 1, in step 5, if it is determined that the two or more established nodes are in two or more sub-networks, that is, the new node can be added to the two or more sub-networks (step 5.3), the two or more sub-networks may be connected by the new node. As shown in an example in FIG. 3d, a specific process may be that after a new node 7 is established, a distance between the node 7 and each of a node 2 and a node 6 meets the connection condition. Therefore, the node 7 is connected to the node 2 and the node 7 is connected to the node 6. The node 7 is connected to two or more established nodes. Therefore, it may be determined whether the two or more nodes are already connected or the two or more nodes are already in a network. As shown in FIG. 3d, the node 2 is in a sub-network 1, and the node 6 is in a sub-network 2, that is, the two or more established nodes are in two or more sub-networks. In this case, the sub-network 1 may be connected to the sub-network 2 by the node 7, that is, the sub-network 1 and the sub-network 2 are merged into a new sub-network 3. The sub-network 1 and the sub-network 2 may be merged to form the new sub-network 3 in the following manner: creating a new entry in the network information table, and recording an identifier of the sub-network 3, nodes (nodes 1 to 7) included in the sub-network 3, coverage of the sub-network 3, and the like; or recording a sub-network associated with nodes 1 to 7 as the sub-network 3 in the network information table.

In a possible implementation, the nodes connected to the new node may further be added to the new sub-network formed through the connection.

In a possible implementation, if a current entire system includes a base station working in the single-baseline RTK mode and a base station working in the network RTK mode (for example, base stations included in sub-networks), in this case, if receiving an obtaining request sent by a mobile station, the cloud server may obtain a base station of which distance to the mobile station is within a preset distance according to position information of the mobile station and determine, according to the position information of the mobile station and coverage of the sub-networks, whether the mobile station falls within coverage of a sub-network.

Figure 4:
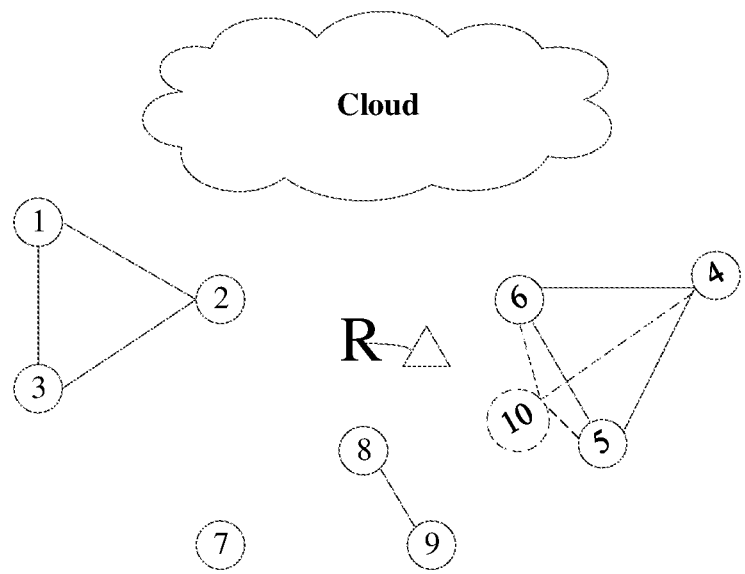
FIG. 4 is a schematic diagram of a positioning system according to an embodiment of the present disclosure.

FIG. 4 is a schematic diagram of a positioning system according to an embodiment of the present disclosure. As shown in FIG. 4, a positioning system includes single base stations 7, 8, and 9 that do not form a network and two sub-networks that have been formed, which are a sub-network 1 on the left side and a sub-network 2 on the right side. A mobile station R may send an obtaining request to the cloud server. After receiving the obtaining request sent by the mobile station R, the cloud server may parse the obtaining request to obtain position information of the mobile station R.

If the cloud server obtains one or more base stations such as the base stations 8 and 9 shown in FIG. 4 of which distances to the mobile station R are within a preset distance, and the mobile station falls within coverage of a sub-network (the sub-network 2), the cloud server may further calculate a virtual base station such as a virtual base station 10 shown in FIG. 4 according to position information of a plurality of base stations and the position information of the mobile station in the sub-network 2. One base station to which the mobile station subscribes may be selected from the one or more base stations of which the distances to the mobile station are within the preset distance and the virtual base station. For example, a base station nearest to the mobile station may be selected. The selection process may alternatively be performed by the mobile station. The cloud server sends data (position information, an identifier, and the like) of the virtual base station and device information of the base stations of which the distances to the mobile station are within the preset distance to the mobile station, and the mobile station selects one to-be-subscribed base station according to a set rule and returns device information of the to-be-subscribed base station to the cloud server. In this way, before a complete network is formed, the system may still provide an accurate positioning service to a user when having base stations of two working modes.

According to the method for establishing a positioning system provided in the implementations of the present disclosure, a positioning system can be gradually established, requirements of users may be satisfied with less investment when there are fewer users in the early stage, and a network is gradually formed with the increase of users, so that more users can be covered by using fewer base stations.

Figure 5:
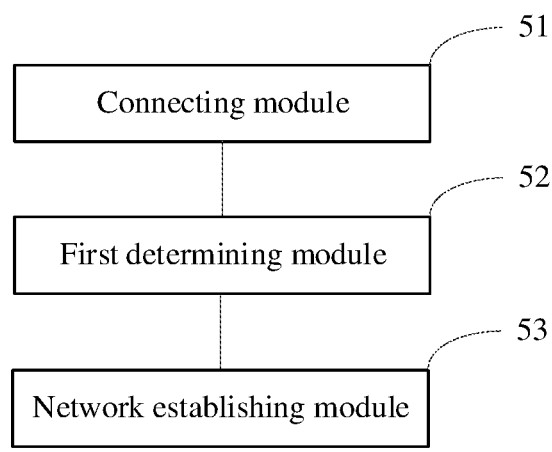
FIG. 5 is a block diagram of an apparatus for establishing a positioning system according to an embodiment of the present disclosure.

The present disclosure further provides an apparatus for establishing a positioning system. FIG. 5 is a block diagram of an apparatus for establishing a positioning system according to an embodiment of the present disclosure. The apparatus is applicable to a server such as the cloud server. As shown in FIG. 5, the apparatus includes:

- a connecting module 51, configured to connect, if a distance between a new node and an established node meets a connection condition, the new node to the established node;
- a first determining module 52, configured to determine, if the new node is connected to two or more established nodes, whether the two or more established nodes include a node that is in a sub-network; and
- a network establishing module 53, configured to add, if the two or more established nodes include the node that is already in the sub-network, the new node and the nodes connected to the new node to the sub-network.

According to the apparatus for establishing a high-precision positioning system of the present disclosure, network RTK may be gradually established. In addition, a user may use a single-baseline RTK positioning service before the network RTK is formed, and the network RTK is formed once a networking condition is met. A positioning network is gradually established through single-baseline RTK, requirements of users may be satisfied with less investment when there are fewer users in the early stage, and the network is gradually formed with the increase of users, so that more users can be covered by using fewer base stations.

Figures 6, 7:
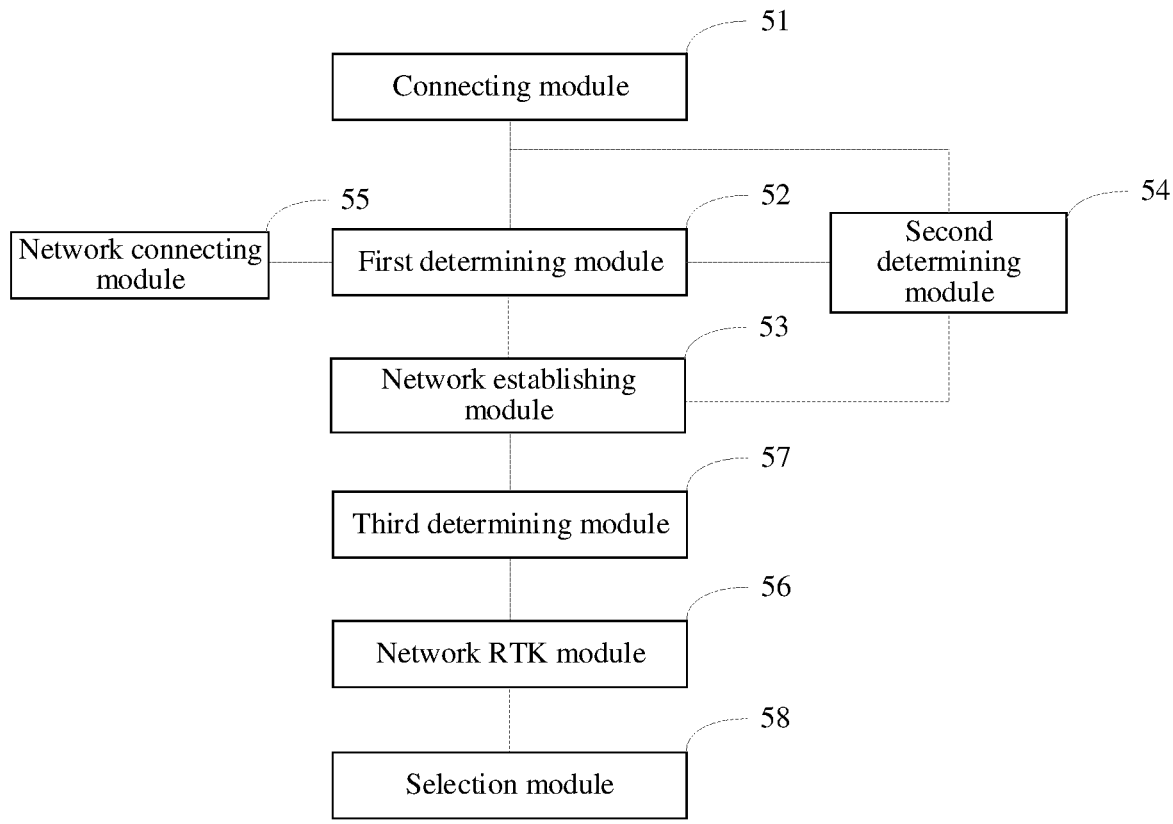
FIG. 6 is a block diagram of an apparatus for establishing a positioning system according to an embodiment of the present disclosure.
FIG. 7 is a flowchart of a method for establishing a positioning network according to an embodiment of this application.

FIG. 6 is a block diagram of an apparatus for establishing a positioning system according to an embodiment of the present disclosure. As shown in FIG. 6, in a possible implementation, the apparatus further includes:

- a second determining module 54, configured to determine whether at least two connected nodes exist in the two or more established nodes; and
- the network establishing module 53 being further configured to form, if the two or more established nodes do not include a node that is already in the sub-network but the at least two connected nodes exist in the two or more established nodes, a sub-network among the new node and the at least two connected nodes.

In a possible implementation, the apparatus further includes:

- a network connecting module 55, configured to connect, if the new node is capable of being added to two or more sub-networks, the two or more sub-networks by the new node.

In a possible implementation, the apparatus further includes:

- a network RTK module 56, configured to determine, when an obtaining request sent by a mobile station is received, whether the mobile station is within coverage of any sub-network according to position information of the mobile station carried in the obtaining request, calculate, if the mobile station is within coverage of one sub-network, a virtual base station according to the position information of the mobile station and position information of a base station in the sub-network, and return information about the virtual base station to the mobile station, so that the mobile station performs positioning by using the virtual base station.

In a possible implementation, the apparatus further includes:

- a third determining module 57, configured to obtain, if the positioning system includes a base station working in a single-baseline RTK mode and a base station working in a network RTK mode, and when an obtaining request sent by the mobile station is received, a base station of which distance to the mobile station is within a preset distance according to position information of the mobile station carried in the obtaining request, and determine, according to the position information of the mobile station and coverage of sub-networks, whether the mobile station falls within coverage of one sub-network;
- the network RTK module 56 being further configured to calculate, if one or more base stations of which distances to the mobile station are within the preset distance are obtained and the mobile station falls within the coverage of the sub-network, the virtual base station according to the position information of the mobile station and position information of a plurality of base stations in the sub-network; and
- a selection module 58, configured to select one base station to which the mobile station subscribes from the one or more base stations of which the distances to the mobile station are within the preset distance and the virtual base station.

This application further provides another method for establishing a positioning network. A positioning network is applied to a positioning system, the positioning network includes a data processing center and at least one reference station, and one node in the positioning network represents one reference station. FIG. 7 is a flowchart of a method for establishing a positioning network according to an embodiment of this application. As shown in FIG. 7, the method includes the following steps.

Step S701. Determine, if a first historical positioning network capable of forming a new positioning network with a newly added node exists in a network list of the data processing center, whether the newly added node forms the new positioning network with the first historical positioning network.

Step S702. Determine, if the network list does not exist in the data processing center, whether the newly added node is capable of forming a new positioning network with nodes in a first node information list.

Figure 8:
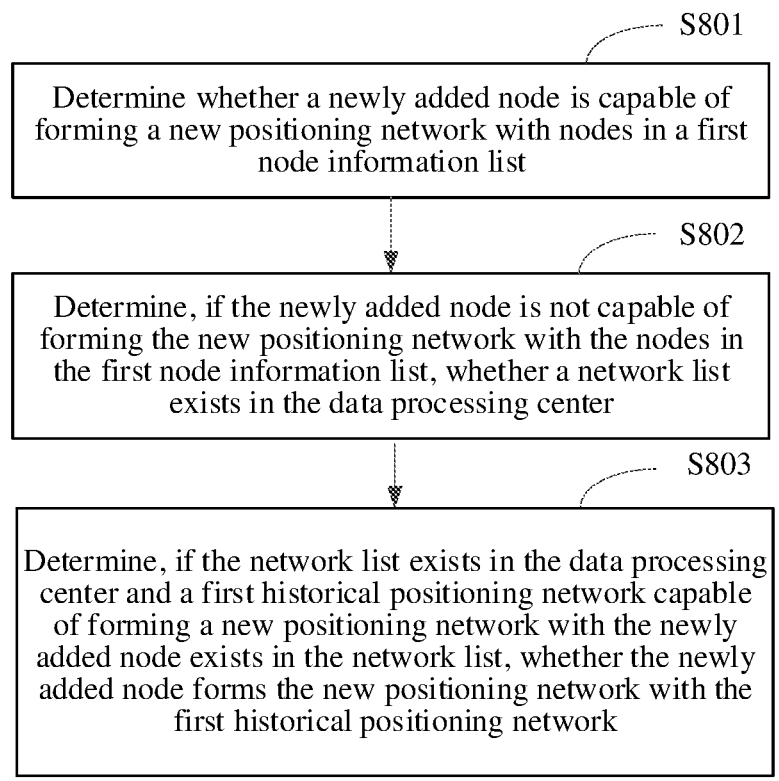
FIG. 8 is a flowchart of a method for establishing a positioning network according to another embodiment of this application.

Alternatively, FIG. 8 is a flowchart of a method for establishing a positioning network according to another embodiment of this application. As shown in FIG. 8, the method may include the following steps.

Step S801. Determine whether a newly added node is capable of forming a new positioning network with nodes in a first node information list.

Step S802. Determine, if the newly added node is not capable of forming the new positioning network with the nodes in the first node information list, whether a network list exists in the data processing center.

Step S803. Determine, if the network list exists in the data processing center and a first historical positioning network capable of forming a new positioning network with the newly added node exists in the network list, whether the newly added node forms the new positioning network with the first historical positioning network.

The network list may be a list in which network information of historical positioning networks that have been established is recorded. The first node information list may be a list in which information about nodes that have not established a positioning network is recorded.

When a newly added node is registered, the data processing center may first determine whether the network list exists or first determine whether the first node information list exists. This is not limited in this application. Therefore, when a newly added node is registered, the data processing center may determine a node that forms a new positioning network with the newly added node by using any one of the two processes described above. Example 1. If the data processing center first determines whether the network list exists, and when the network list exists in the data processing center, the data processing center may perform step S701. If the network list does not exist in the data processing center, the data processing center may perform step S702.

Example 2. If the data processing center first determines whether the first node information list exists, and when the first node information list exists in the data processing center, the data processing center may perform step S801. If the first node information list does not exist in the data processing center, the data processing center may perform steps S802 and S803.

In a possible implementation, before the step of determining, if a first historical positioning network capable of forming a new positioning network with a newly added node exists in a network list of the data processing center, whether the newly added node forms the new positioning network with the first historical positioning network, the method further includes:

receiving, by the data processing center, node information of the newly added node, and storing the node information in the first node information list.

In a possible implementation, the first node information list includes at least two nodes that are not capable of forming a network currently.

In a possible implementation, before the step of determining, if a first historical positioning network capable of forming a new positioning network with a newly added node exists in a network list of the data processing center, whether the newly added node forms the new positioning network with the first historical positioning network, the method further includes:

determining a position relationship between the newly added node and a second historical positioning network in the network list; and determining, according to the position relationship and by using a preset rule, the first historical positioning network capable of forming the new positioning network with the newly added node from the second historical positioning network.

In this implementation of this application, "first" and "second" are used for distinguishing different features, and are not limited to a specific order.

The second historical positioning network in the network list may be all historical positioning networks recorded in the network list. The data processing center may determine a position relationship between the newly added node and the second historical positioning network according to position information of the newly added node and position information of nodes forming the second historical positioning network. For example, the newly added node is located inside or outside the second historical positioning network. That the newly added node is located inside the second historical positioning network may mean that the newly added node is located inside a triangle formed by three nodes forming the second historical positioning network, and that the newly added node is located outside the second historical positioning network may mean that the newly added node is located outside the triangle formed by the three nodes forming the second historical positioning network.

The data processing center may set a preset rule. For different position relationships, the first historical positioning network capable of forming the new positioning network with the newly added node is selected from the second historical positioning network.

In a possible implementation, the determining, according to the position relationship and by using a preset rule, the first historical positioning network capable of forming the new positioning network with the newly added node from the second historical positioning network includes: determining, if the position relationship is that the newly added node is located inside the second historical positioning network, that the second historical positioning network is the first historical positioning network capable of forming the new positioning network with the newly added node.

In a possible implementation, the newly added node and all nodes forming the first historical positioning network form a new network according to a Delaunay triangulation algorithm.

In a possible implementation, the determining, according to the position relationship and by using a preset rule, the first historical positioning network capable of forming the new positioning network with the newly added node from the second historical positioning network includes: determining, according to a first preset rule if the position relationship is that the newly added node is located outside the second historical positioning network, whether the first historical positioning network capable of forming the new positioning network with the newly added node exists in the network list of the data processing center, where the first preset rule is: determining whether at least two nodes of which distances to the newly added node are less than a first preset value exist among N nodes forming a second historical positioning network; and determining, if the at least two nodes of which the distances to the newly added node are less than the first preset value exist among the N nodes forming the second historical positioning network, that the first historical positioning network capable of forming the new positioning network with the newly added node exists in the network list, and add, if at least two nodes of which the distances to the newly added node are less than the first preset value do not exist among the N nodes forming the second historical positioning network, the newly added node to the first node information list, where N is a positive integer.

That is, if the newly added node is located outside each historical positioning network, the data processing center may calculate a distance between the newly added node and each node in the second historical positioning network and determine whether the distance D is less than Dmax (a first preset threshold). If at least two nodes meet a condition, the newly added node and all the nodes in the second historical positioning network form new positioning networks according to a Delaunay triangulation algorithm. If such nodes do not exist, the newly added node is added to a node list (the first node information list) that cannot form a network. The data processing center may continue to determine whether the newly added node and existing nodes in the node list that cannot form a network can form a network.

In a possible implementation, if at least two first historical positioning networks meeting the first preset rule exist in the network list, the at least two first historical positioning networks and the newly added node form a new positioning network. For example, a new positioning network may be formed according to the Delaunay triangulation algorithm.

In a possible implementation, the determining whether the newly added node forms the new positioning network with the first historical positioning network includes:
  determining, according to the preset rule of the data processing center, whether the newly added node forms the new positioning network with the first historical positioning network, or indicating, according to a user instruction, whether the newly added node forms the new positioning network with the first historical positioning network.

In a possible implementation, the determining whether the newly added node is capable of forming a new positioning network with nodes in the first node information list includes: determining, according to a second preset rule, whether the newly added node is capable of forming the new positioning network with the nodes in the first node information list, where
  the second preset rule is: determining whether at least two nodes that form at least a triangle with the newly added node exist in the first node information list, where a distance of each edge of the triangle is less than or equal to a second preset value; and adding, if the at least two nodes exist, the newly added node and node information of the at least two nodes to the network list, and adding, if the at least two nodes do not exist, the newly added node to the first node information list.

The second preset value may be the same as the first preset value or may be different from the first preset value. This is not limited in this application.

In a possible implementation, after the adding the newly added node and node information of the at least two nodes to the network list, the method further includes: determining whether the newly added node forms a new positioning network with the nodes; and
  the determining whether the newly added node forms a new positioning network with the nodes includes:
    determining, according to the preset rule of the data processing center, whether the newly added node forms the new positioning network with the nodes, or indicating, according to a user instruction, whether the newly added node forms the new positioning network with the nodes.

In a possible implementation, the newly added node and the nodes forms a new network according to a Delaunay triangulation algorithm.

In a possible implementation, the method further includes:
  receiving, by the data processing center, a position recommendation request sent by a user;
  obtaining, in response to the position recommendation request, a recommended position based on position information of the historical positioning networks or position information of the nodes in the first node information list; and
  sending, according to a preset newly added node position and the recommended position, the recommended position and/or the preset newly added node position to the user, where the preset newly added node position is a position at which the user expects to establish a node.

The position recommendation request may be a request sent by the user to the data processing center when a new base station (node) needs to be established. When the user sends the position recommendation request, the position recommendation request may carry the position at which the user expects to establish a node.

In a possible implementation, the method further includes: obtaining, by the data processing center, a recommended position based on position information of at least two historical positioning networks in the network list, and sending the recommended position to a user.

In a possible implementation, the obtaining a recommended position based on position information of the historical positioning networks includes:
  selecting at least two historical positioning networks from the network list of the data processing center; and
  determining whether a distance between circumscribed circles of the two historical positioning networks is less than a third preset value, and using, if the distance is less than the third preset value, a position of an intersection formed on a two-dimensional plane and formed by drawing a circle by using a center of circle of a circumscribed circle of each historical positioning network as a center of circle and a sum of a radius of the circumscribed circle and a fourth preset value as a radius as the recommended position.

In an example, the data processing center may determine whether two or more historical positioning networks exist in a network list. If the two or more historical positioning networks exist, any two historical positioning networks are selected, and it is determined whether a distance d between circumscribed circles of the historical positioning networks is less than 2dmax. If a historical positioning network 1 and a historical positioning network 2 meet the condition, a circle is drawn by using a center of circle of a circumscribed circle of each historical positioning network as a center of circle and a sum of a radius of the circumscribed circle and dmax as a radius, and an intersection of two circles is a recommended position. 2dmax is an example of the third preset value.

In a possible implementation, the obtaining a recommended position based on position information of the nodes in the first node information list includes: using a position of a node capable of forming a network with at least two nodes in the first node information list as the recommended position.

In a possible implementation, the recommended position may be calculated according to the Delaunay triangulation algorithm and position information of the at least two nodes. For example, the data processing center may calculate the recommended position according to position information of two nodes and by using the Delaunay triangulation algorithm. Alternatively, the data processing center may calculate the recommended position according to position information of four nodes and by using the Delaunay triangulation algorithm.

In a possible implementation, the sending, according to a preset newly added node position and the recommended position, the recommended position and/or the preset newly added node position to the user includes:
  determining whether the preset newly added node position coincides with the recommended position, sending the recommended position to the user if the preset newly added node position coincides with the recommended position, and sending the preset newly added node position and the recommended position to the user if the preset newly added node position does not coincide with the recommended position.

Application Example

1. Newly establish a base station i, i∈{1,n}, which refers to n base stations.
2. The newly established base station i establishes a communication connection with a server (a data processing center) through a wireless communication network, a wired network, or the like, and sends position information Pi=(Lati, Loni, hi) (latitude, longitude, height) of the base station i to the server.
3. Store basic information of the base station node and anode information list at a server end, where the list includes a node number and position information of a node.

For example, information about all base stations registered in the server is stored in the form of {i,Pi} {i+1,Pi+1}.

4. A process in which a new node forms a network is as follows (the new node can form a network as much as possible).
  Step 1. The server determines, when receiving node information {i, Pi} of a newly registered base station, whether a quantity of nodes in the node information list is greater than or equal to 3.

If there is only one node, the newly registered base station works in a single-baseline RTK mode.

If there are two nodes, it is determined whether the newly established base station and the two nodes meet a networking condition. If the newly established base station and the two nodes meet the networking condition, the newly established base station and the two nodes form a network, and the newly established base station works in a network RTK mode. If the newly established base station and the two nodes do not meet the networking condition, the newly established base station and the two nodes do not form the network, and the newly established base station still works in the single-baseline RTK mode.

Step 2. Search, if the quantity of nodes is greater than or equal to 3, a network list to determine whether a historical network exists (whether the network list is empty).
  Step 2.1. Determine, if the historical network exists, whether a new node is capable of being added to the historical network to form a new network with the historical network.

Specifically, it is determined whether a position of the new node is within coverage of a historical network.
  (1) If the position of the new node is within the coverage (the node is in a region of the network), the new node and all nodes in the historical network form the new network according to a Delaunay triangulation algorithm.
  (2) If the new node is outside the coverage of the network, a distance D between the new node and each node in the historical network is calculated, and it is determined whether D<Dmax. If at least two nodes meet the condition, the new node and all the nodes in the historical network form the new network according to the Delaunay triangulation algorithm. If such historical nodes do not exist, the new node is added to a node list that cannot form a network (it may continue to be determined whether the new node and existing nodes in the node list that cannot form a network are capable of forming a network.
  (3) If the new node is outside the coverage of the network, and two or more historical networks such as a network 1 and a network 2 to which the new node is capable of being added exist, nodes included in the two networks and the new node form a new network according to the Delaunay triangulation algorithm.
  Step 2.2. Calculate, if the historical network does not exist but nodes that can form a network exist in the node information list, a networking manner of the nodes according to the Delaunay triangulation algorithm, and store networking information in the network list, where the nodes that already form a network work in the network RTK mode, and the nodes that do not form the network still work in the single-baseline mode.

A distance of each edge of a triangle formed by any three nodes in the node list is calculated, and the distance is less than Dmax. if the triangle exists, node information of the three corresponding nodes is stored in the node list that can form a network, and nodes that do not meet the condition are added to the node list that cannot form a network.

According to an aspect of the present disclosure, a positioning method is provided, using the positioning network. The positioning network includes a data processing center and at least one reference station, and one node in the positioning network represents one reference station. The positioning method includes:
  sending, by a mobile station, a positioning request to the data processing center, where the positioning request carries position information of the mobile station;
  sending, in response to the positioning request, positioning data to the mobile station based on the position information of the mobile station and coverage of each positioning network in a network list; and
  performing, by the mobile station, positioning according to the positioning data.

In a possible implementation, if the mobile station is within coverage of a positioning network, the sending positioning data to the mobile station includes: calculating a virtual node according to the position information of the mobile station and position information of nodes in the positioning network, sending node information of the virtual node to the mobile station, and performing, by the mobile station, positioning according to positioning data sent by the virtual node.

In a possible implementation, if the mobile station is outside the coverage of the positioning network, the sending positioning data to the mobile station includes: determining at least one first node meeting a third preset rule from a plurality of nodes in the positioning network, sending node information of the first node to the mobile station, and performing, by the mobile station, positioning according to positioning data sent by the node, where the third preset rule is determining a first node that is nearest to the mobile station from the plurality of nodes in the positioning network.

In a possible implementation, the positioning data is corrected positioning data of the virtual node or the first node for the mobile station.

Figure 9:
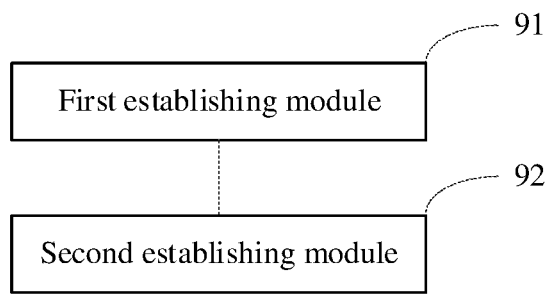
FIG. 9 is a block diagram of an apparatus for establishing a positioning network according to an embodiment of this application.

According to an aspect of the present disclosure, an apparatus for establishing a positioning network is provided. The positioning network is applied to a positioning system, the positioning network includes a data processing center and at least one reference station, and one node in the positioning network represents one reference station. FIG. 9 is a block diagram of an apparatus for establishing a positioning network according to an embodiment of this application. The apparatus includes:

a first establishing module 91, configured to determine, if a first historical positioning network capable of forming a new positioning network with a newly added node exists in a network list of the data processing center, whether the newly added node forms the new positioning network with the first historical positioning network; and a second establishing module 92, configured to determine, if the network list does not exist in the data processing center, whether the newly added node is capable of forming a new positioning network with nodes in a first node information list.

The second establishing module 92 is further configured to determine whether the newly added node forms the new positioning network with the nodes.

In a possible implementation, the apparatus further includes: a determining module, configured to determine whether a network list exists or whether a first node information list exists. The determining module may be respectively connected to the first establishing module 91 and the second establishing module 92. The first establishing module 91 and the second establishing module 92 respectively perform a next operation according to a result of determining of the determining module.

In a possible implementation, the apparatus further includes:

a position determining unit, configured to determine a position relationship between the newly added node and a second historical positioning network in the network list; and a network determining unit, configured to determine, according to the position relationship and by using a preset rule, the first historical positioning network capable of forming the new positioning network with the newly added node from the second historical positioning network.

In a possible implementation, the network determining unit is configured to determine, if the position relationship is that the newly added node is located inside the second historical positioning network, that the second historical positioning network is the first historical positioning network capable of forming the new positioning network with the newly added node.

In a possible implementation, the network determining unit is further configured to determine, according to a first preset rule if the position relationship is that the newly added node is located outside the second historical positioning network, whether the first historical positioning network capable of forming the new positioning network with the newly added node exists in the network list of the data processing center, where the first preset rule is: determining whether at least two nodes of which distances to the newly added node are less than a first preset value exist among N nodes forming a second historical positioning network; and determine, if the at least two nodes of which the distances to the newly added node are less than the first preset value exist among the N nodes forming the second historical positioning network, that the first historical positioning network capable of forming the new positioning network with the newly added node exists in the network list, and add, if at least two nodes of which the distances to the newly added node are less than the first preset value do not exist among the N nodes forming the second historical positioning network, the newly added node to the first node information list, where N is a positive integer.

In a possible implementation, the second establishing module includes:

a determining unit, configured to determine, according to a second preset rule, whether the newly added node is capable of forming the new positioning network with the nodes in the first node information list, where the second preset rule is: determining whether at least two nodes that form at least a triangle with the newly added node exist in the first node information list, where a distance of each edge of the triangle is less than or equal to a second preset value; and add, if the at least two nodes exist, the newly added node and node information of the at least two nodes to the network list, and add, if the at least two nodes do not exist, the newly added node to the first node information list.

In a possible implementation, the second establishing module further includes:

a networking determining module, configured to determine whether the newly added node forms a new positioning network with the nodes.

In a possible implementation, the apparatus further includes:

a receiving module, configured to receive a position recommendation request sent by a user;

a position recommendation module, configured to obtain, in response to the position recommendation request, a recommended position based on position information of the historical positioning networks or position information of the nodes in the first node information list; and a sending module, configured to send, according to a preset newly added node position and the recommended position, the recommended position and/or the preset newly added node position to the user, where the preset newly added node position is a position at which the user expects to establish a node.

According to an aspect of the present disclosure, an apparatus for establishing a positioning network is provided. The positioning network is applied to a positioning system, the positioning network includes a data processing center and at least one reference station, and one node in the positioning network represents one reference station. The apparatus includes:

a second establishing module, configured to determine, if a first node information list exists in the data processing center, whether a newly added node is capable of forming a new positioning network with nodes in the first node information list;

a determining module, configured to determine, if the newly added node is not capable of forming a new positioning network with the nodes in the first node information list, whether a network list exists in the data processing center; and a first establishing module, configured to determine, if the network list exists in the data processing center and a first historical positioning network capable of forming a new positioning network with the newly added node exists in the network list, whether the newly added node forms the new positioning network with the first historical positioning network.

According to an aspect of the present disclosure, a positioning apparatus is provided, using the positioning network, where the positioning network includes a data processing center and at least one reference station, and one node in the positioning network represents one reference station, and the positioning apparatus includes:

a request sending module of a mobile station, configured to send a positioning request to the data processing center, where the positioning request carries position information of the mobile station;

a response module of the data processing center, configured to send, in response to the positioning request, positioning data to the mobile station based on the position information of the mobile station and coverage of each positioning network in a network list; and a positioning module of the mobile station, configured to perform positioning according to the positioning data.

In a possible implementation, if the mobile station is within coverage of a positioning network, the response module is further configured to calculate a virtual node according to the position information of the mobile station and position information of nodes in the positioning network, and send node information of the virtual node to the mobile station; and the positioning module is further configured to perform positioning according to positioning data sent by the virtual node.

In a possible implementation, if the mobile station is outside the coverage of the positioning network, the response module is further configured to:

determine at least one first node meeting a third preset rule from a plurality of nodes in the positioning network, and send node information of the first node to the mobile station; and the positioning module is further configured to perform positioning according to positioning data sent by the node, where the third preset rule is determining a first node that is nearest to the mobile station from the plurality of nodes in the positioning network.

In a possible implementation, the positioning data is corrected positioning data of the virtual node or the first node for the mobile station.

Figure 10:
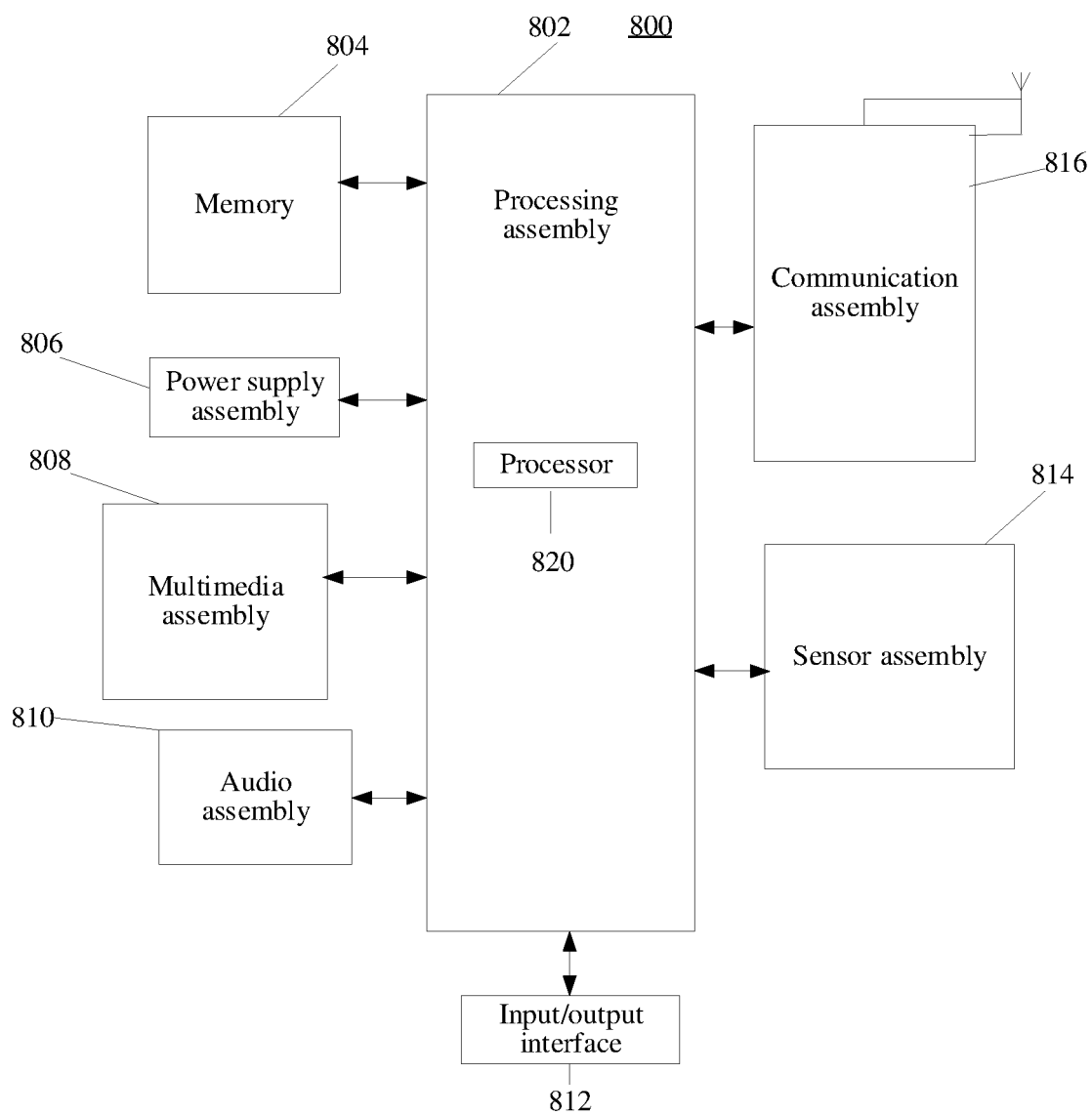
FIG. 10 is a block diagram of a mobile station according to an exemplary embodiment.

FIG. 10 is a block diagram of a mobile station 800 according to an exemplary embodiment.

Referring to FIG. 10, the mobile station 800 may include one or more of the following assemblies: a processing assembly 802, a storage 804, a power supply assembly 806, a multimedia assembly 808, an audio assembly 810, an input/output (I/O) interface 812, a sensor assembly 814, and a communication assembly 816.

The processing assembly 802 usually controls the entire operation of the mobile station 800, such as operations associated with displaying, a phone call, data communication, a camera operation, and a recording operation. The processing assembly 802 may include one or more processors 820 to execute instructions, to complete all or some steps of the foregoing method. In addition, the processing assembly 802 may include one or more modules, to facilitate the interaction between the processing assembly 802 and other assemblies. For example, the processing assembly 802 may include a multimedia module, to facilitate the interaction between the multimedia assembly 808 and the processing assembly 802.

The memory 804 is configured to store various types of data to support operations on the mobile station 800. Examples of the data include instructions, contact data, phonebook data, messages, pictures, videos, and the like of any application or method used to be operated on the mobile station 800. The memory 804 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply assembly 806 provides power to various assemblies of the mobile station 800. The power supply assembly 806 may include a power supply management system, one or more power supplies, and other assemblies associated with generating, managing, and allocating power for the mobile station 800.

The multimedia assembly 808 includes a screen providing an output interface between the mobile station 800 and a user. In some embodiments, the screen may include a liquid crystal display (LCD) and a touch panel (TP). If the screen includes the TP, the screen may be implemented as a touchscreen to receive an input signal from the user. The touch panel includes one or more touch sensors to sense a touch, a slide, and a gesture on the touch panel. The touch sensor may not only sense a perimeter of the touch or slide movement, but also detect duration and pressure related to the touch or slide operation. In some embodiments, the multimedia assembly 808 includes a front camera and/or a rear camera. When the mobile station 800 is in an operation mode, such as a shoot mode or a video mode, the front camera and/or the rear camera may receive external multimedia data. Each front camera and rear camera may be a fixed optical lens system or have a focal length and an optical zooming capability.

The audio assembly 810 is configured to output and/or input an audio signal. For example, the audio assembly 810 includes a microphone (MIC), and when the mobile station 800 is in an operation mode, such as a call mode, a recording mode, and a voice identification mode, the MIC is configured to receive an external audio signal. The received audio signal may be further stored in the memory 804 or sent through the communication assembly 816. In some embodiments, the audio assembly 810 further includes a loudspeaker, configured to output an audio signal.

The I/O interface 812 provides an interface between the processing assembly 802 and an external interface module. The external interface module may be a keyboard, a click wheel, buttons, or the like. The buttons may include, but not limited to: a homepage button, a volume button, a start-up button, and a locking button.

The sensor assembly 814 includes one or more sensors, configured to provide status evaluation in each aspect to the mobile station 800. For example, the sensor assembly 814 may detect an opened/closed status of the mobile station 800, and relative positioning of the assembly. For example, the assembly is a display and a small keyboard of the mobile station 800. The sensor assembly 814 may further detect the position change of the mobile station 800 or one assembly of the mobile station 800, the existence or nonexistence of contact between the user and the mobile station 800, the azimuth or acceleration/deceleration of the mobile station 800, and the temperature change of the mobile station 800. The sensor assembly 814 may include a proximity sensor, configured to detect the existence of nearby objects without any physical contact. The sensor assembly 814 may further include an optical sensor, such as a CMOS or CCD image sensor, that is used in an imaging application. In some embodiments, the sensor assembly 814 may further include an acceleration sensor, a gyroscope sensor, a magnetic sensor, a pressure sensor, or a temperature sensor.

The communication assembly 816 is configured to facilitate communication in a wired or wireless manner between the mobile station 800 and other devices. The mobile station 800 may access a wireless network based on communication standards, such as Wi-Fi, 2G, or 3G, or a combination thereof. In an exemplary embodiment, the communication assembly 816 receives a broadcast signal or broadcast related information from an external broadcast management system via a broadcast channel. In an exemplary embodiment, the communication assembly 816 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In an exemplary embodiment, the mobile station 800 can be implemented as one or more of electronic elements such as an application specific integrated circuit (ASIC), a digital signal processor (DSP), a digital signal processing device (DSPD), a programmable logic device (PLD), a field programmable gate array (FPGA), a controller, a micro-controller, or a microprocessor, so as to perform the method.

In an exemplary embodiment, a non-volatile computer-readable storage medium is further provided, including, for example, a memory 804 including computer program instructions, where the foregoing computer program instructions may be executed by a processor 820 of the mobile station 800 to complete the foregoing method.

Figure 11:
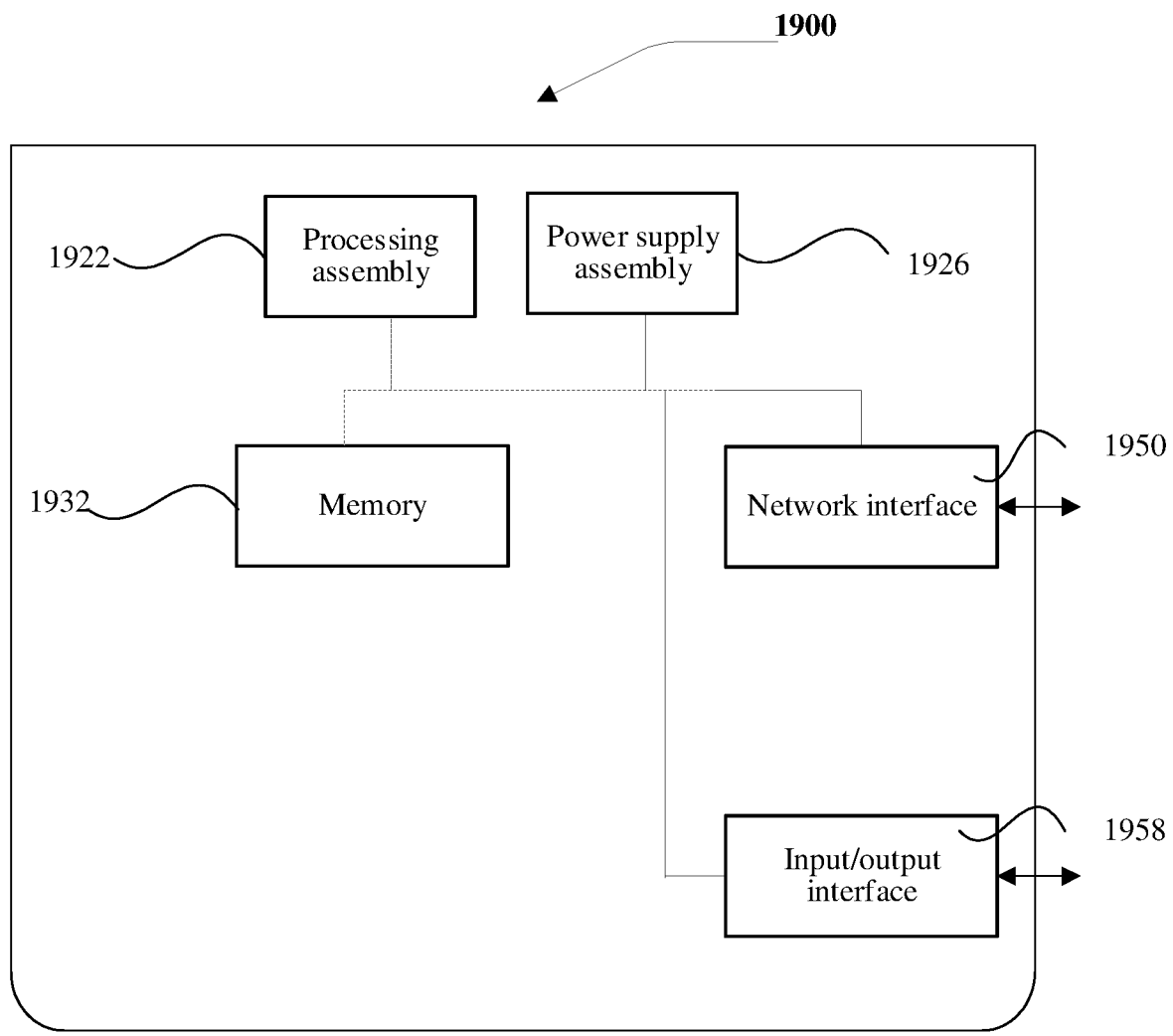
FIG. 11 is a block diagram of an apparatus for establishing a positioning system according to an exemplary embodiment.

FIG. 11 is a block diagram of an apparatus 1900 for establishing a positioning system according to an exemplary embodiment. For example, the apparatus 1900 may be provided as a server. Referring to FIG. 11, the apparatus 1900 includes a processing assembly 1922, the processing assembly 1922 further including one or more processors, and a memory resource represented by a memory 1932, the memory resource being used for storing instructions, for example, an application program, that can be executed by the processing assembly 1922. The application program stored in the memory 1932 may include one or more modules, each of which corresponds to a set of instructions. In addition, the processing assembly 1922 is configured to execute instructions, so as to execute the foregoing method.

The apparatus 1900 may further include a power supply assembly 1926, configured to perform power supply management of the apparatus 1900, a wired or wireless network interface 1950, configured to connect the apparatus 1900 to a network, and an input/output (I/O) interface 1958. The apparatus 1900 may operate an operating system stored in the memory 1932, for example, Windows Server™, Mac OS X™, Unix™, Linux™, or FreeBSD™.

In an exemplary embodiment, a non-volatile computer-readable storage medium is further provided, including, for example, a memory 1932 including computer program instructions, and the foregoing computer program instructions may be executed by a processing assembly 1922 of the apparatus 1900 to complete the foregoing method.

The present disclosure may be a system, a method, and/or a computer program product. The computer program product may include a computer-readable storage medium, storing computer-readable program instructions used for causing the processor to implement the aspects of the present disclosure.

The computer-readable storage medium may be a physical device that can retain and store an instruction used by an instruction-executing device. The computer-readable storage medium may be, for example, but is not limited to, an electrical storage device, a magnetic storage device, an optical storage device, an electromagnetic storage device, a semiconductor storage device, or any appropriate combination of the above. In a more specific example (a non-exhaustive list), the computer-readable storage medium includes a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punched card or protrusion in a groove in which instructions are stored, and any appropriate combination of the above. The computer-readable storage medium as used herein is not explained as a transient signal itself, such as a radio wave or other electromagnetic waves propagated freely, an electromagnetic wave propagated through a waveguide or other transmission media (e.g., a light pulse propagated through an optical fiber cable), or an electrical signal transmitted over a wire.

The computer-readable program instructions described herein may be downloaded to various computing/processing devices from the computer-readable storage medium or may be downloaded to an external computer or an external storage device through a network such as the Internet, a local area network, a wide area network, and/or a wireless network. The network may include copper transmission cables, optical fiber transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions used for performing operations of the present disclosure may be assembly instructions, instruction set architecture (ISA) instructions, machine instructions, machine-related instructions, microcode, firmware instructions, status setting data, or source code or object code written in any combination of one or more programming languages. The programming languages including object-oriented programming languages such as Smalltalk and C++, and conventional procedural programming languages such as "C" language or similar programming languages. Computer-readable program instructions may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider). In some embodiments, an electronic circuit, such as a programmable logic circuit, a field programmable gate array (FPGA), or a programmable logic array (PLA), is customized by using status information of the computer-readable program instructions. The electronic circuit may execute the computer-readable program instructions to implement various aspects of the present disclosure.

Aspects of the present disclosure are described with reference to flowchart illustrations and/or block diagrams of methods, apparatuses (systems) and computer program products according to embodiments of the present disclosure. It should be understood that each block in flowcharts and/or block diagrams and a combination of blocks in the flowchart and/or the block diagram can be implemented by using computer-readable program instructions.

These computer-readable program instructions may be provided to a processor of a general purpose computer, special purpose computer, or another programmable data processing apparatus to produce a machine, such that the instructions, which being executed via the processor of the computer or another programmable data processing apparatus, generate an apparatus for implementing the functions/acts specified in one or more blocks of the flowcharts and/or the block diagrams. Alternatively, the computer-readable program instructions may be stored in the computer-readable storage medium. The instructions cause a computer, a programmable data processing apparatus, and/or another device to work in a specific manner. Therefore, the computer-readable medium storing the instructions includes an artifact that includes instructions implementing the functions/acts specified in one or more blocks of the flowcharts and/or the block diagrams.

Alternatively, the computer-readable program instructions may be loaded onto a computer, another programmable data processing apparatus, or another device to cause a series of operational steps to be performed on the computer, the another programmable data processing apparatus, or the another device to produce a computer implemented process such that the instructions which execute on the computer, the another programmable data processing apparatus, or the another device implement the functions/acts specified in one or more blocks of the flowcharts and/or block diagrams.

The flowcharts and block diagrams in the accompanying drawings illustrate architectures, functions, and operations that may be implemented for systems, methods, and computer program products according to a plurality of embodiments of the present disclosure. In this regard, each box in a flowchart or a block diagram may represent a module, a program segment, or a part of instruction. The module, the program segment or the part of instruction includes one or more executable instructions used for implementing specified logic functions. In some implementations used as substitutes, functions annotated in boxes may alternatively occur in a sequence different from that annotated in an accompanying drawing. For example, actually two continuous boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or action, or may be implemented by using a combination of dedicated hardware and a computer instruction.

The embodiments of the present disclosure have been described above. The above description is an example rather than non-exhaustive and is not limited to the disclosed embodiments. Many modifications and changes are apparent to those of ordinary skill in the art without departing from the scope and spirit of the described embodiments. The terminology used in this specification was chosen to best explain the principles of the embodiments, the practical application, or technical improvement of terminologies in the marketplace, or to enable others of ordinary skill in the art to understand the embodiments disclosed in this specification.

What is claimed is:

1. A method for establishing a positioning network, wherein the method comprises:
    receiving node information of a newly added node, and storing the node information in a first node information list, wherein the newly added node and a node in the positioning network comprise a reference station;
    determining a position relationship between the newly added node and a second historical positioning network in a network list;
    determining, if the position relationship is that the newly added node is located inside the second historical positioning network, that the second historical positioning network is a first historical positioning network capable of forming a third positioning network with the newly added node;
    determining, if the first historical positioning network exists in the network list, whether the newly added node forms the third positioning network with the first historical positioning network; and
    determining, if the first historical positioning network does not exist in the network list, whether the newly added node is capable of forming a fourth positioning network with nodes in the first node information list.

2. The method according to claim 1, wherein the first node information list comprises at least two nodes that are not capable of forming a network currently.

3. The method according to claim 1, further comprising:
    determining, according to the position relationship and by using a preset rule, the first historical positioning network capable of forming the third positioning network with the newly added node, wherein determining the first historical positioning network comprises:
    determining, according to a first preset rule if the position relationship is that the newly added node is located outside the second historical positioning network, whether the first historical positioning network capable of forming the new positioning network with the newly added node exists in the network list of the data processing center, wherein:
    the first preset rule comprises: determining whether at least two nodes of which distances to the newly added node are less than a first preset value exist among N nodes forming the second historical positioning network; and determining, if the at least two nodes of which the distances to the newly added node are less than the first preset value exist among the N nodes forming the second historical positioning network, that the first historical positioning network capable of forming the new positioning network with the newly added node exists in the network list; and adding, if the at least two nodes of which the distances to the newly added node are less than the first preset value do not exist among the N nodes forming the second historical positioning network, the newly added node to the first node information list, wherein N is a positive integer.

4. The method according to claim 3, wherein if at least two first historical positioning networks meeting the first preset rule exist in the network list, the at least two first historical positioning networks and the newly added node form a new positioning network.

5. The method according to claim 1, wherein determining whether the newly added node forms the third positioning network with the first historical positioning network comprises:
determining, according to a preset rule of the data processing center, whether the newly added node forms the third positioning network with the first historical positioning network, or indicating, according to a user instruction, whether the newly added node forms the third positioning network with the first historical positioning network.

6. The method according to claim 1, wherein determining whether the newly added node is capable of forming the fourth positioning network with the nodes in the first node information list comprises: determining, according to a second preset rule, whether the newly added node is capable of forming the fourth positioning network with the nodes in the first node information list, wherein
the second preset rule comprises: determining whether at least two nodes that form at least a triangle with the newly added node exist in the first node information list, wherein a length of each edge of the triangle is less than or equal to a second preset value; adding, if the at least two nodes exist, the newly added node and node information of the at least two nodes to the network list; and adding, if the at least two nodes do not exist, the newly added node to the first node information list.

7. The method according to claim 6, wherein after adding the newly added node and the node information of the at least two nodes to the network list, the method further comprises: determining whether the newly added node forms the fourth positioning network with the nodes; and
determining whether the newly added node forms the fourth positioning network with the nodes comprises:
determining, according to a preset rule of the data processing center, whether the newly added node forms the fourth positioning network with the nodes, or indicating, according to a user instruction, whether the newly added node forms the fourth positioning network with the nodes.

8. The method according to claim 1, further comprising:
receiving, by the data processing center, a position recommendation request sent by a user;
obtaining, in response to the position recommendation request, a recommended position based on position information of the first historical positioning network or the second historical positioning network or position information of the nodes in the first node information list; and
sending, according to a preset newly added node position and the recommended position, the recommended position and/or the preset newly added node position to the user, wherein the preset newly added node position is a position at which the user expects to establish a new node.

9. The method according to claim 1, further comprising: obtaining, by the data processing center, a recommended position based on position information of at least two historical positioning networks in the network list, and sending the recommended position to a user.

10. The method according to claim 9, wherein obtaining the recommended position based on the position information of the at least two historical positioning networks comprises:
selecting the at least two historical positioning networks from the network list; and
determining whether a distance between circumscribed circles of the at least two historical positioning networks is less than a third preset value, and using, if the distance is less than the third preset value, a position of an intersection formed on a two-dimensional plane and formed by drawing a circle by using a center of circle of a circumscribed circle of each historical positioning network as a center of circle and a sum of a radius of the circumscribed circle and a fourth preset value as a radius as the recommended position.

11. The method according to claim 8, wherein obtaining the recommended position based on the position information of the nodes in the first node information list comprises: using a position of a node capable of forming a network with at least two nodes in the first node information list as the recommended position.

12. The method according to claim 8, wherein sending, according to the preset newly added node position and the recommended position, the recommended position and/or the preset newly added node position to the user comprises:
determining whether the preset newly added node position coincides with the recommended position, sending the recommended position to the user if the preset newly added node position coincides with the recommended position, and sending the preset newly added node position and the recommended position to the user if the preset newly added node position does not coincide with the recommended position.

13. The method according to claim 1, further comprising:
sending, by a mobile station, a positioning request to the data processing center, wherein the positioning request carries position information of the mobile station;
sending, in response to the positioning request, positioning data to the mobile station based on the position information of the mobile station and a coverage of each positioning network in the network list; and
performing, by the mobile station, positioning according to the positioning data.

14. The method according to claim 13, wherein if the mobile station is within coverage of one positioning network, and sending the positioning data to the mobile station comprises:
calculating a virtual node according to the position information of the mobile station and position information of a plurality of nodes in the one positioning network, sending positioning data of the virtual node to the mobile station, and performing, by the mobile station, positioning according to the positioning data of the virtual node.

15. The method according to claim 13, wherein if the mobile station is outside a coverage of one positioning network, and sending the positioning data to the mobile station comprises:
determining at least one first node meeting a third preset rule from a plurality of nodes in the one positioning network, sending positioning data of the at least one first node to the mobile station, and performing, by the mobile station, positioning according to the positioning data of the at least one first node, wherein the third preset rule comprises determining a first node that is nearest to the mobile station from the plurality of nodes in the one positioning network.

16. A method for establishing a positioning network, the method comprising:
- receiving node information of a newly added node, and storing the node information in a first node information list, wherein the newly added node and a node in the positioning network comprise a reference station;
- determining a position relationship between the newly added node and a second historical positioning network in a network list;
- determining, according to the position relationship and by using a first preset rule, a first historical positioning network capable of forming a third positioning network with the newly added node from the second historical positioning network;
- determining, if the first historical positioning network exists in the network list, whether the newly added node forms the third positioning network with the first historical positioning network; and
- determining, if the first historical positioning network does not exist in the network list, whether the newly added node is capable of forming a fourth positioning network with nodes in the first node information list according to a second preset rule, wherein:
  - the second preset rule comprises: determining whether at least two nodes that form at least a triangle with the newly added node exist in the first node information list, wherein a length of each edge of the triangle is less than or equal to a second preset value; adding, if the at least two nodes exist, the newly added node and node information of the at least two nodes to the network list; and adding, if the at least two nodes do not exist, the newly added node to the first node information list.

17. A method for establishing a positioning network, the method comprising:
- receiving node information of a newly added node, and storing the node information in a first node information list, wherein the newly added node and a node in the positioning network comprise a reference station;
- determining a position relationship between the newly added node and a second historical positioning network in a network list;
- determining, according to the position relationship and by using a first preset rule, a first historical positioning network capable of forming a third positioning network with the newly added node from the second historical positioning network;
- determining, if the first historical positioning network exists in the network list, whether the newly added node forms the third positioning network with the first historical positioning network;
- determining, if the first historical positioning network does not exist in the network list, whether the newly added node is capable of forming a fourth positioning network with nodes in the first node information list;
- receiving a positioning request of a mobile station, wherein the positioning request carries position information of the mobile station;
- determining, based on the position information of the mobile station and a coverage of each positioning network in the network list, whether the mobile station is located in a coverage of one positioning network; and
- if the mobile station is located in the coverage of the one positioning network, calculating a virtual node according to the position information of the mobile station and respective position information of corresponding nodes in the one positioning network, and sending positioning data of the virtual node to the mobile station, to cause the mobile station to perform positioning according to the positioning data of the virtual node.

\* \* \* \* \*